(12) United States Patent
Madden et al.

(10) Patent No.: US 9,569,837 B2
(45) Date of Patent: Feb. 14, 2017

(54) LABEL INSPECTION SYSTEM AND METHOD

(71) Applicant: CREST SOLUTIONS LIMITED, County Cork (IE)

(72) Inventors: Frank Madden, Ballinhassig (IE); Denis O'Sullivan, Crosshaven (IE); Lisa Higgins, Mallow (IE); Michael Duffy, Minane Bridge (IE); Eddie Cassidy, The Ward (IE); Donal Harrington, Blackrock (IE); Neil Kingston, Ballinhassig (IE)

(73) Assignee: Crest Solutions Limited, Little Island, County Cork (IE)

( * ) Notice: Subject to any disclaimer, the term of this patent is extended or adjusted under 35 U.S.C. 154(b) by 0 days.

(21) Appl. No.: 14/760,671

(22) PCT Filed: Jan. 9, 2014

(86) PCT No.: PCT/EP2014/050282
§ 371 (c)(1),
(2) Date: Jul. 13, 2015

(87) PCT Pub. No.: WO2014/108460
PCT Pub. Date: Jul. 17, 2014

(65) Prior Publication Data
US 2015/0356717 A1 Dec. 10, 2015

Related U.S. Application Data

(60) Provisional application No. 61/752,145, filed on Jan. 14, 2013.

(51) Int. Cl.
G06K 15/00 (2006.01)
G06T 7/00 (2006.01)
(Continued)

(52) U.S. Cl.
CPC ............ *G06T 7/001* (2013.01); *G06K 15/024* (2013.01); *H04N 1/00005* (2013.01);
(Continued)

(58) Field of Classification Search
None
See application file for complete search history.

(56) References Cited

U.S. PATENT DOCUMENTS

2002/0140990 A1\* 10/2002 Liu ..................... G02B 7/28
358/406
2004/0179717 A1\* 9/2004 Furukawa ............. G06T 7/001
382/112
(Continued)

FOREIGN PATENT DOCUMENTS

WO 2011/090475 A1 7/2011
WO WO 2011090475 A1 \* 7/2011 .......... B41F 33/0036

OTHER PUBLICATIONS

International Search Report; PCT/EP2014/050282; Aug. 9, 2014.

*Primary Examiner* — Huo Long Chen
(74) *Attorney, Agent, or Firm* — Studebaker & Brackett PC

(57) ABSTRACT

A label inspection system fixture (1) has a scanner and housing (10) for performing full inline or offline inspection within a printer (20). The fixture (1) comprises a control circuit (5) with a processor within a curved guide plate (6). The scanner (10) communicates with the circuit (5), which in turn communicates with a host computer (VPU). The VPU identifies regions in a scanned label and applies to each region an inspection tool associated with that region. At least some of said tools include a stored training image and associated test data defining said regions and inspection criteria for the regions.

19 Claims, 19 Drawing Sheets

(51) Int. Cl.
*G06K 15/02* (2006.01)
*H04N 1/00* (2006.01)

(52) U.S. Cl.
CPC ..... *H04N 1/00042* (2013.01); *H04N 1/00082* (2013.01); *G06T 2207/10008* (2013.01); *G06T 2207/30168* (2013.01); *G06T 2207/30176* (2013.01)

(56) References Cited

U.S. PATENT DOCUMENTS

| | | | |
|---|---|---|---|
| 2006/0055760 A1* | 3/2006 | Cummins | B41J 3/01 347/104 |
| 2006/0115127 A1* | 6/2006 | Hatayama | B41J 29/393 382/112 |
| 2007/0212143 A1* | 9/2007 | Ohara | H04N 1/00002 400/62 |
| 2009/0202134 A1* | 8/2009 | Kano | G06K 9/2054 382/141 |

* cited by examiner

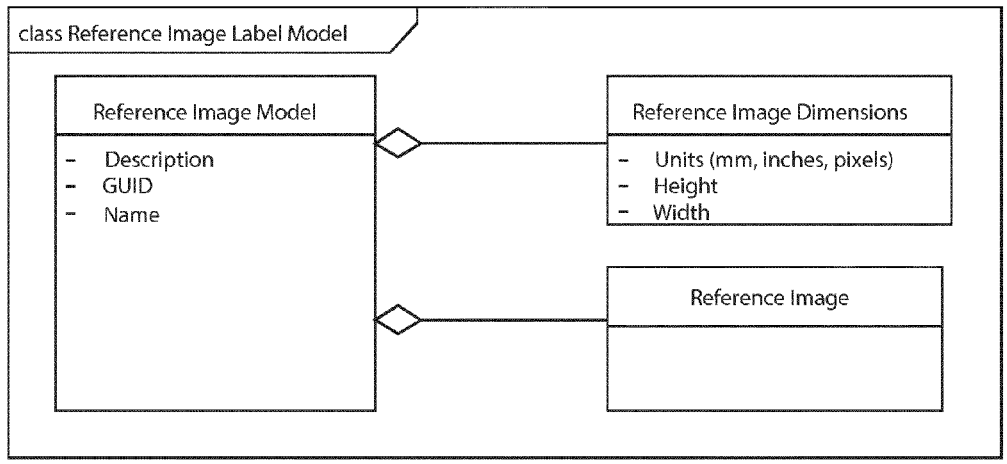
Fig.12 Scanned Image Label Model
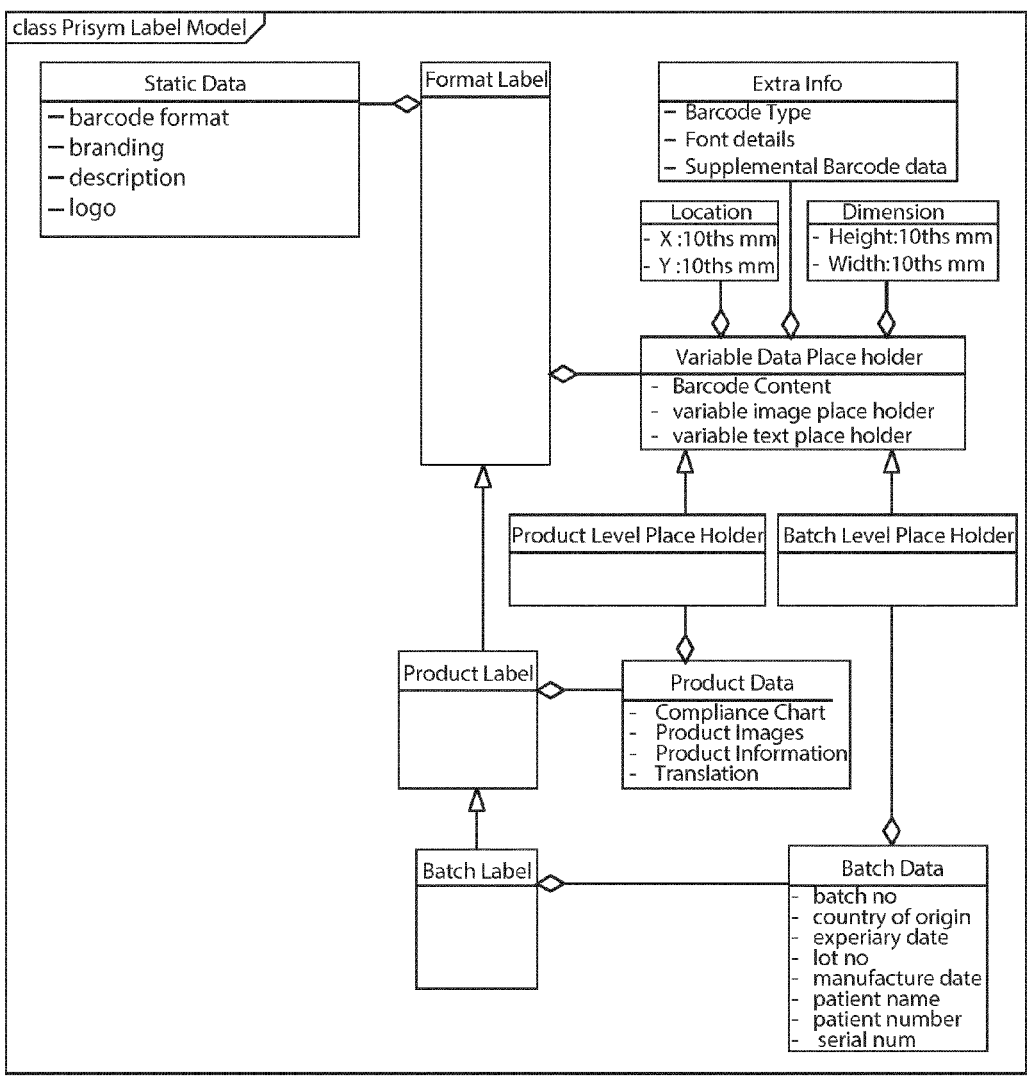
Fig.13 Label Model

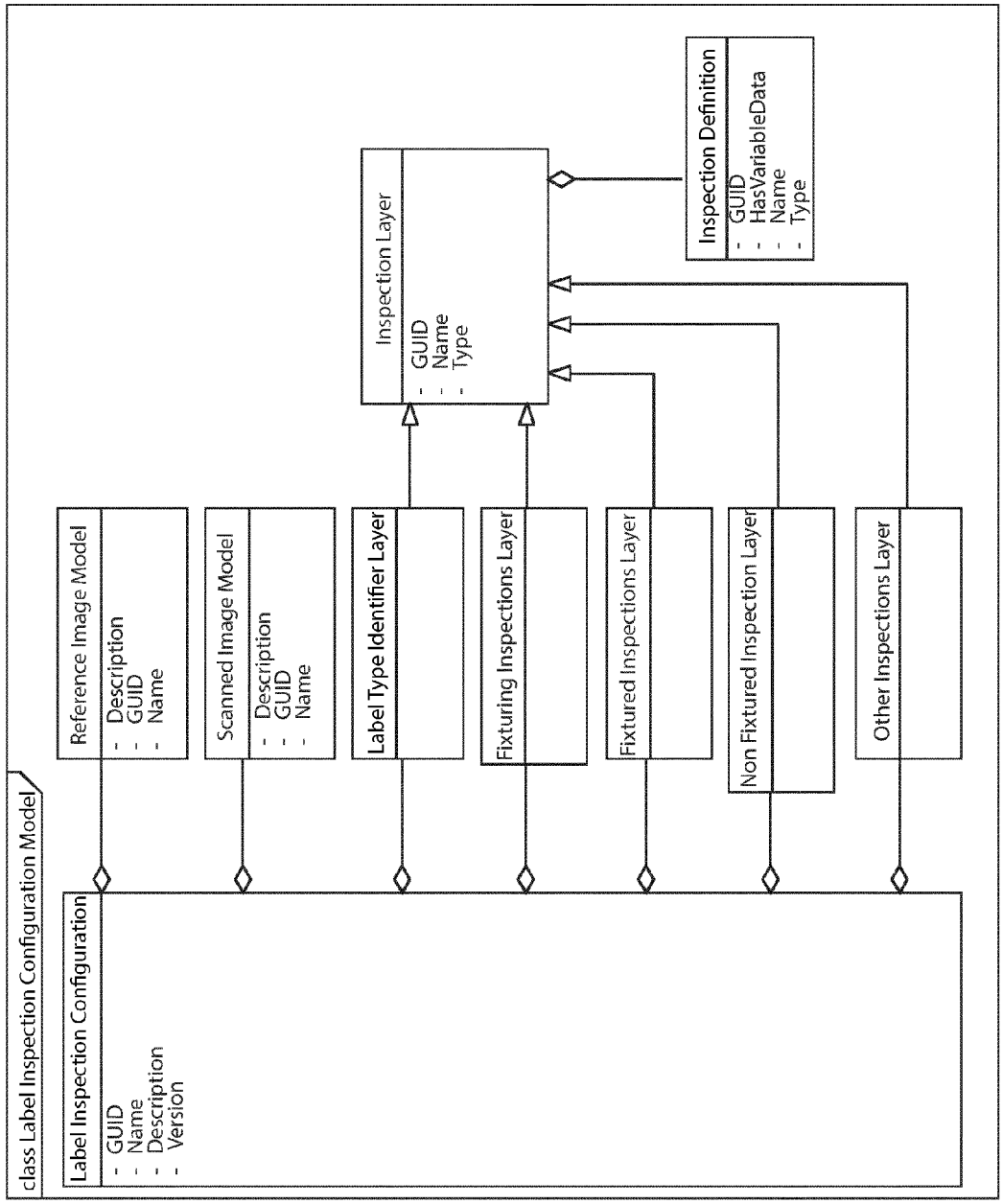
Fig.14 High Level Inspection Configuration Model

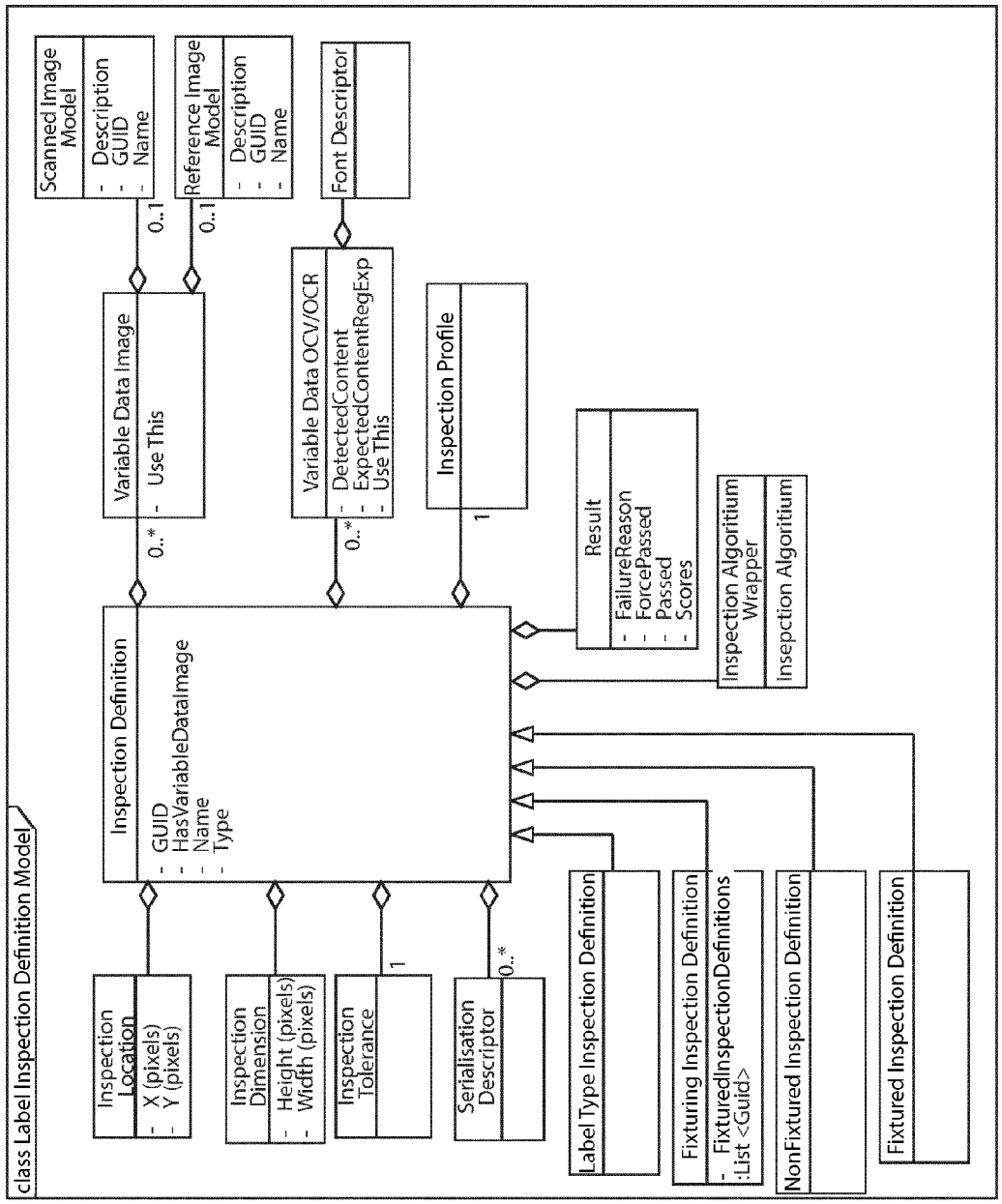
Fig.15 High Level Inspection Definition Model

LABEL INSPECTION SYSTEM AND METHOD

INTRODUCTION

The invention relates to inspection of labels with important information, such as labels for medical, pharmaceutical products or indeed any products for which accuracy of the label is very important. In this specification, the term "label" means any type of label, and substrates with multiple pages such as booklets to be shipped with products.

Typically, the printing is done by industrial thermal printers. However, these are prone to printing problems. The labels are subsequently inspected by humans, which is not ideal for this type of methodical, repetitive task. The problems that are being inspected for may arise from any or a combination of: rollers being misaligned slightly, inkjet print head misalignment, ink inconsistencies, paper inconsistencies or incorrect data applied to the label for example. Also, problems may arise where the label has a thickness greater than that of a single sheet, such as where a small booklet is being printed on its outside cover.

The present invention is directed towards achieving a greater degree of automation and reliability in the inspection process.

SUMMARY OF THE INVENTION

According to the invention, label inspection system comprising:
  a label scanner and a scanner controller, and
  a processor adapted to analyze scanned images with inspection tools and determine a quality control output,
  wherein the processor is adapted to identify regions in a scanned label and to perform inspection associated with each region, and
  wherein at least some of said tools include a stored training image and associated test data defining said regions and inspection criteria for the regions.

In one embodiment, the scanner is mounted in a housing of a fixture arranged to be incorporated into or onto a printer to receive a feed of labels driven by a printer without need for a drive dedicated to the inspection.

In one embodiment, the housing includes a label web guide plate.

In one embodiment, the processor includes at least some components housed within said housing. In one embodiment, the scanner controller is adapted to cause image acquisition in real time in a manner which is synchronized with speed of the printer label movement.

In one embodiment, the scanner is a line scanner, and the scanner controller is adapted to trigger line scans according to label speed to achieve a desired pixel shape. In one embodiment, the scanner controller is adapted to monitor printer motor operation to determine in real time the label speed. Preferably, the scanner controller is adapted to non-intrusively monitor said label speed. In one embodiment, the scanner controller is adapted to probe printer motor drive signals.

In one embodiment, the scanner is a contact image sensor scanner. In one embodiment, the scanner includes an adjustment mechanism to adjust size of a gap through which a label passes as it is being scanned. In one embodiment, said adjustment mechanism is adapted to determine optimum gap by focusing on a test label.

In one embodiment, a training image defines said regions.

In one embodiment, the processor is adapted to carry out fixturing, in which XY coordinates of a region to be inspected are located and used to determine both area and position of the region, and the processor compensates for positional variation of said region and of additional regions by deducing their locations. Preferably, the processor is adapted to perform said compensation to the extent of compensating for label distortion arising from label stretching, skewing, sliding, and/or buckling. In one embodiment, the processor is adapted to determine region location and size according to one or more anchor points.

In one embodiment, the processor is adapted to generate and store an inspection configuration for each type of label, with an inspection definition per label region and a reference image. In one embodiment, the inspection configuration contains inspection definitions in layers with containers holding inspection definitions to be applied at that layer. In one embodiment, the reference label includes a format label, a product label, and a batch label. In one embodiment, the format label defines the label structure including:
  variable placeholders including an image placeholder, a text string placeholder, a code placeholder, a line, a box or a circle, and location and dimensions for each placeholder.

In one embodiment, the product label is a specialization of the format label and includes a set of product level placeholders for data known at label design time.

Preferably, the batch label is a specialization of the product label in which batch level variable data is captured as a set of variable batch data which is not known until print time, and said batch label is adapted to capture batch data including serialization descriptors as individual label identifiers such as serial numbers.

In one embodiment, the inspection definitions define type of inspection and the location and dimension of the inspection definition specifies the region of the reference image to which the inspection definition applies.

In one embodiment, an inspection definition declares whether or not there is variable data associated with the inspection and the details of that variable data including the expected format of a string to be inspected and string content and a font descriptor, and a serialization descriptor holding the details of the serialization and randomization inspections. In one embodiment, the processor is adapted to attach an inspection profile to an inspection definition, and detail of the inspection profile for a given inspection definition is obtained from an inspection context, in which the profile holds the parameters of the inspection types.

In one embodiment, at least some inspection definitions contain an inspection tolerance for the region's location and dimension.

In one embodiment, said definitions define search regions that are less tightly defined than the equivalent print regions and therefore aid in compensating for movement in label elements as viewed by the scanner.

In one embodiment, at least some inspection definitions contain a result object to hold inspection results including scores of each parameter achieved by the inspection.

In one embodiment, the system comprises an inspection tool adapted to perform the steps of:
  storing a template from a region of interest in a training image,
  aligning each image being inspected to the training image,
  subtracting the current image from the training image,
  creating an absolute difference image, analyzing the absolute difference image to extract differences detected within the region of interest of the current image.

Preferably, the tool is adapted to perform automatic normalization of grey scale to compensate for small variability of grey scale. In one embodiment, the tool is adapted to use additional internal images to handle edge effects and mis-registration errors caused by print characteristics. In one embodiment, the tool is adapted to perform filtering operations to further reduce unimportant small differences.

In one embodiment, the tool is adapted to perform discrimination and measurement of the individual detected missing and excess differences (blobs) and the combined whole differences, to perform classification of the measurements to extract only the defective blobs.

In one embodiment, the processor is adapted to develop inspection functions during label design, and to select inspection tools during label design time as an integral part of a label design process, said tools including an inspection context defining what is to be inspected at a level of abstraction.

In one embodiment, the system is adapted to develop said tools by adapting a tool template with insertion of specific configuration settings such as geometric coordinates and inspection criterion.

In one embodiment, the inspection tools include a tool for barcode testing, said tool being adapted to locate and decode one barcode line in a region of an input image, and to characterize the barcode in quality terms.

In one embodiment, said tool is adapted to compare a decoded string against a fixed value or a batch-defined value.

In one embodiment, the system includes an inspection tool adapted to perform a positional check on blocks of text or images to be inspected, wherein said tool is adapted to operate in a specified region to detect missing characters on text that may not be suitable for text recognition; and wherein the inspection tools include a text recognition tool adapted to perform optical character recognition (OCR) and to use said recognition to perform verification of character strings.

In one embodiment, said tool is configured with a font file that defines layout of each character in the font in the scanned image; and wherein said tool performs a pattern match between characters in the specified font file and scanned characters.

In one embodiment, the processor is adapted to execute a fine graphic inspection tool to combine features of blob and pattern match tools and image comparison methods to give accurate inspection results; and wherein the tool is applied to information and graphics.

In one embodiment, the processor is adapted to operate a run-time state machine to manage user requests and idle states, and wherein the processor is adapted to manage a busy state with states including some or all of printer unlock, image acquire, printer block, record result, present result, and inspect image.

In one embodiment, the processor is adapted to execute runtime software which is modular to the extent of being deployable on a stand-alone basis or integrated with label design software.

In one embodiment, the system comprises a dedicated database for reference images and inspection data.

In another aspect, the invention provides a method of developing software for a label inspection system as defined above in any embodiment, the method comprising the steps of during label design identifying label print regions and specifying inspection requirements on a per-region basis.

In one embodiment, the inspection requirements are provided as an inspection context which is a structured, layered, hierarchical, description of required inspection configurations, and the method includes developing a context during design time, and the method comprises the system automatically generating inspection configurations in run time.

In one embodiment, there are at least two forms of inspection context, including a product label context describing required inspection definitions at a product label, and a batch level context for variable data which is not be specified until print time.

In one embodiment, the method comprises, during run time, caching inspection configurations such that for recurrent print jobs of the same product label only batch related information need be processed. In one embodiment, the context is constructed in a manner that maps to a compliant inspection configuration and contains at least all the data required to generate the inspection configuration. In one embodiment, the context includes a reference image upon which the inspection definitions are to be built and an inspection profile definitions containing parameter values for a given inspection type.

In one embodiment, the context includes a plurality of layers, each layer having a dedicated container holding a collection of inspection definition contexts applicable to that layer.

In another aspect, the invention provides a computer readable medium comprising software code adapted to perform the operations of a processor of a system as defined above in any embodiment or of a method as defined above in any embodiment when executed by a digital processor.

DETAILED DESCRIPTION OF THE INVENTION

The invention will be more clearly understood from the following description of some embodiments thereof, given by way of example only with reference to the accompanying drawings in which:—

FIGS. 12 to 17 are model diagrams for the system;

DETAILED DESCRIPTION OF THE EMBODIMENTS

Overview

Printed artefacts such as labels are inspected in-line or off-line. The labels are printed using thermal transfer printers and the inspection system's image acquisition device (for example a Contact Image Scanner "CIS") is mounted directly onto the printer (but has the capability to be removed with ease). The image acquisition device is synchronized with the printer and utilizes an IO card and a relevant motor clock frequency to measure whether the labels are moving or not. The image acquisition device passes an image to a visual processing unit ("VPU") and the VPU executes inspection software, called the "PrintInspector Runtime" software. This performs global template comparison ("GTC"), grading, verification, recognition and other inspections. The user sets up the Runtime software using an interface which allows user configuration of settings, and these settings include directions as to inspection results to be outputted.

Figure 1:
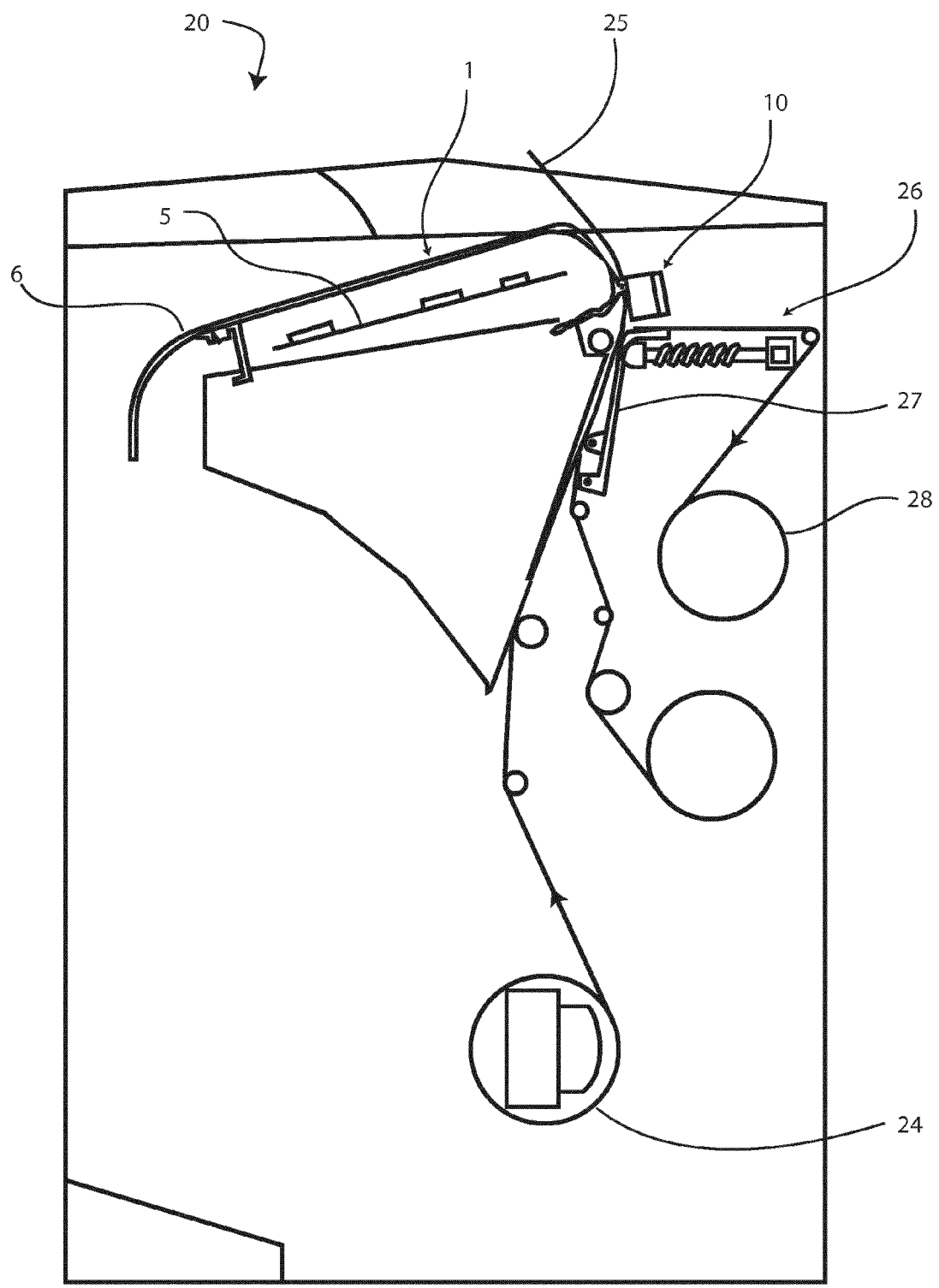
FIG. 1 is a diagrammatic view of a label test system installed within a printer.

FIG. 1 shows an inspection system local part 1 (the "fixture") with a scanner 10 and a housing 6 containing a control circuit 5 of the fixture, for performing full inline or offline inspection within a third party printer 20. The fixture's control circuit 5 has a processor. The housing 6 is in the form of a curved guide plate 6 for guiding a web on a curved surface with sufficient angle to convey labels in a loop without peeling of the labels, and for housing the system's control circuit 5. The plate 6 has slots for a cable loom from a connector to LEDs mounted on a side wall of the plate 6, a power supply and a USB cable to communicate with the VPU. The scanner 10 is attached to the top of the guide plate 6.

The label web is drawn from a reel 24 and is pressed against the plate 6 by a biased guide plate 27. Printed labels 25 are ejected as they pass between the scanner 10 and the plate 6. The web is collected on a take-up reel 28 in a path maintained in tension by a spring mechanism 26. These aspects are not part of the invention.

The invention is not concerned with the arrangement for printing of the labels, only with their inspection in this embodiment, performed by the scanner 10 communicating with the circuit 5, which in turn communicates with a host computer (VPU). The overall inspection system comprises the fixture in or on the printer and the host computer or server, which may be nearby or remote depending on the desired deployment.

Figure 2:
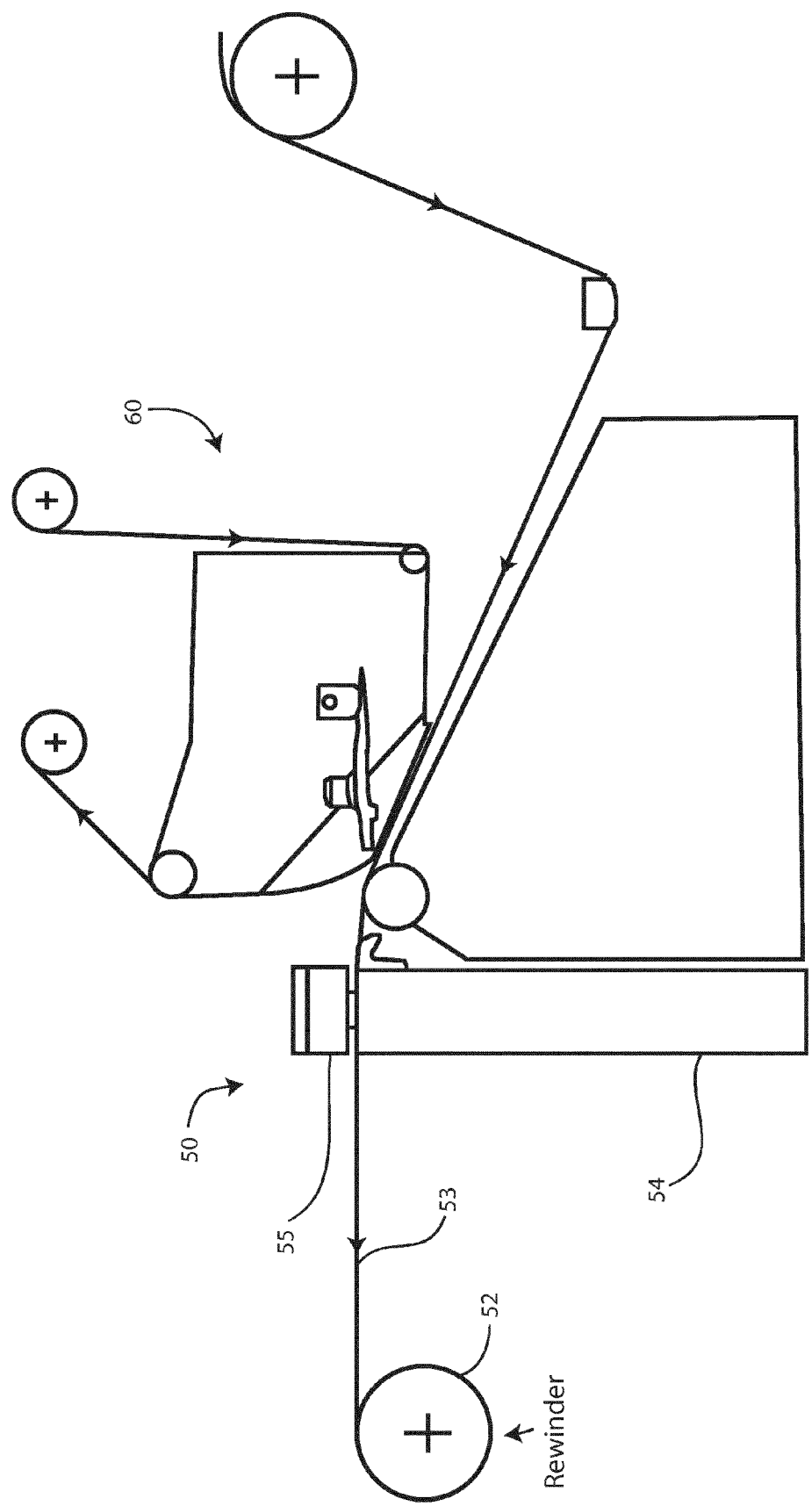
FIG. 2 is a diagrammatic view of another label test system, mounted on the outside of a printer.

Referring to FIG. 2 an inspection system fixture 50 is also for mounting to a third party printer, but in this case on the external side of the printer such as the printer 60 illustrated. The system fixture 50 is shown inspecting labels as they pass on a web 53 to a take-up reel 52. The system fixture 50 comprises a main body 54 and a scanner 55 mounted over the main body 54 at a separation which is adjustable.

Figure 3:
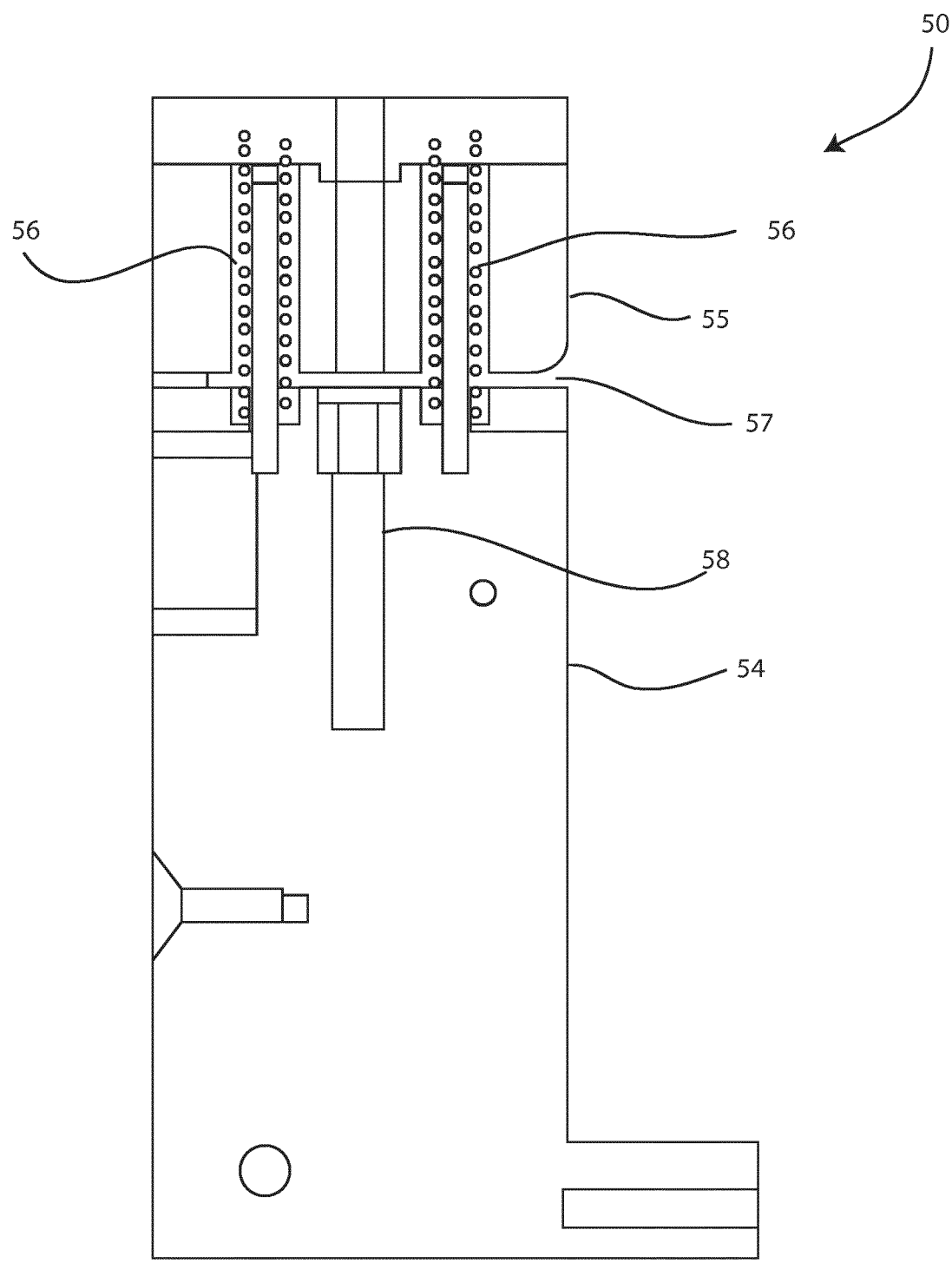
FIG. 3 is a cross-sectional view showing this system in more detail.

FIG. 3 shows the system fixture 50 in more detail. There are four spring-loaded pillars 56 for supporting the scanner 55 at the desired distance. The springs bias the scanner 55 upwardly, to a limit imposed by an adjustable bolt 58. This allows height adjustment to suit the anticipated label thickness and field of view. In some examples the label may be in the form of a small booklet, the outside surface of which is to be printed. This adjustment is performed to ensure that the scanned images are perfectly in focus.

The scanners 10 and 55 use a technology called CIS (Contact Image Sensor) which combines the camera and the lighting in a small form factor package, which has been found to be very suited to label inspection. Data transfer from the acquisition part of the scanner is optimized so as to transfer acquired images to the processor on the local board within the housing 6 or 54 without impacting on either the acquisition process or the inspection process. The scanner can transfer to the processor an already-acquired image while another image is simultaneously being acquired. The processor can be programmed to inspect an already-received image while another image is simultaneously being received. The system can thus be made to inspect labels in real time without impacting print speed.

The scanners 10 and 55 are synchronized with the speed of the printer motor, so that the image obtained is consistent with the printed content regardless of printer motor speed or irregularities. The enclosures 6 and 54 are designed to allow for the integration of some of the inspection system's electronics in a confined space attached to the printer body. The distance between the printer rollers and the scanner is such as to ensure that an entire label is captured after each print cycle. The printer drive mechanism is used to push the label under the scanner, thereby eliminating the need for the inspection system to have a label drive, and thereby being non-intrusive.

It will be seen in the embodiments of FIGS. 1 and 2 that the labels are re-wound on their web onto a take-up reel. This helps to ensure that the label is kept taut on the bed beneath the scanner, such as the bed 57 of FIG. 3. However, this is not absolutely necessary, and a re-winder is also not necessary.

The printers to which the inspection system may be applied may be of any desired type. The speed of the printer motor may be monitored by an encoder, or alternatively by probing a motor clock signal. The later may be processed to derive a motor speed. The determined printer speed is used by the inspection system processor to determine the line trigger in the scanner. As the print speed changes the scanner is aware of the change and compensates to provide the same image size regardless of printer speed. This may achieve a square pixel or a rectangular one of a desired size.

The system determines a printer dots per mm value for the lateral dimension across the label (perpendicular to the direction of travel of the label on the web), and ensures that the line scans are fired at a rate proportional to the Y direction, the direction of travel of the web.

The system is configured to perform character verification initially. If the verification step fails, the tool will then perform character recognition to determine the actual string present. This is an important feature that distinguishes between badly printed text and text that is actually incorrect.
Printer The inspection system of the invention may be used with any third party printer. This is because a fixture either internally or externally mounted passively captures images without being intrusive to the printing that is taking place. Signals are taken from the printer to determine when a label has started printing, the constant speed when the label is printing, when it is finished printing, and if there is data to print. If there is an error on the printer, the system's software can identify the ribbon, label or miscellaneous errors thrown by the printer.
Image Acquisition The CIS sensor consists of a linear array of detectors, covered by a focusing lens and is flanked by red, green, and blue LED's (lights) for illumination. The working distance (focal point) typically ranges up to 13 mm, the depth of field (focal range) is limited on a CIS and is generally greater than 1 mm. The Contact Image Sensor (CIS) is managed by the fixture's control circuit which sets the LED type, the exposure, and activates the CIS sensor. The control circuit converts the data from analogue data to a digital image and sends it to the host VPU. The fixture control circuit is connected to the printer interface card via a cable, and manages the Contact Image Sensor (CIS), communicating and transferring data to the host PC/VPU and all of the interconnections from the external components. The image acquisition components are housed in (but not limited to) a single enclosure so that it is easy to install and use. It is preferable that mounting of this enclosure doesn't lead to any modifications to the printer, but also allows for the entire label to pass under the scan head. It must also accommodate different label lengths.

Deployment of Systems

Figure 4:
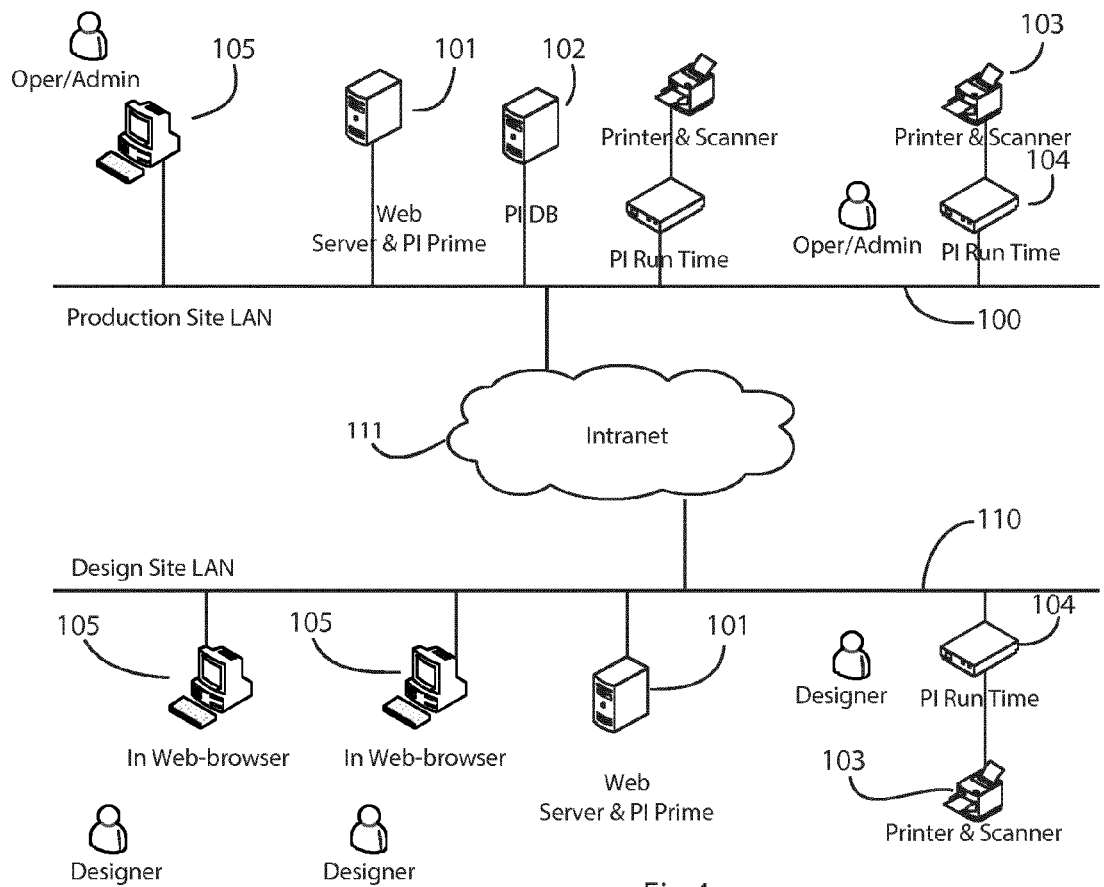
FIGS. 4 to 6 are diagrams for hardware architectures of networks including the test systems in various deployments.
Figure 5:
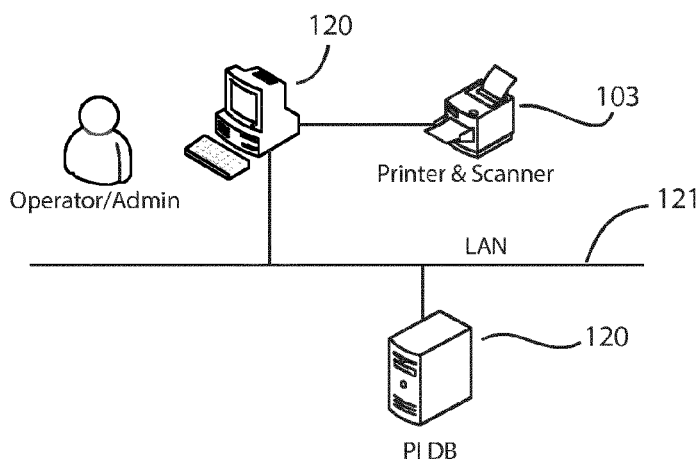
Figure 6:
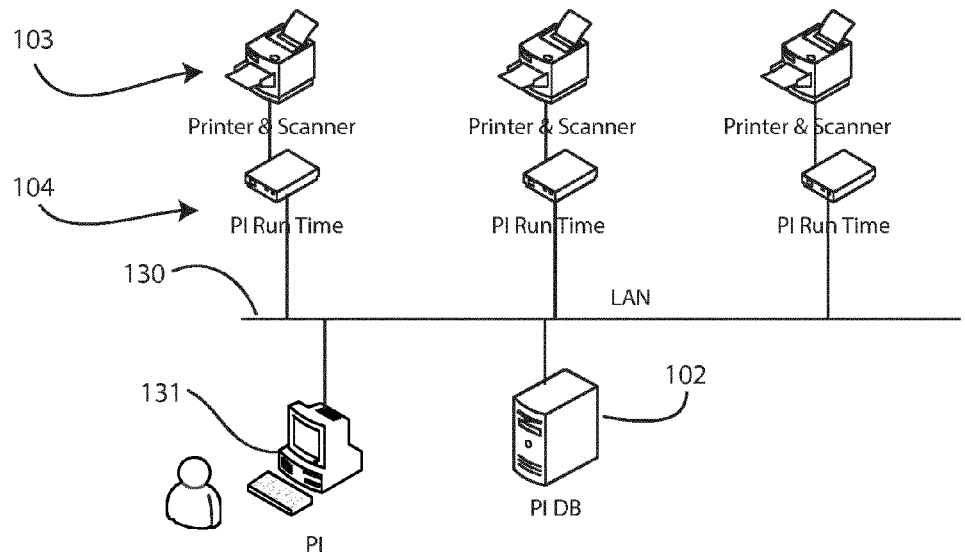

FIGS. 4 to 6 show how the inspection system may be deployed. FIG. 4 shows a production site local area network (LAN) 100 and a design site LAN 110 linked by an intranet 111. The network includes:

- a server 101 for labelling software and the inspection systems;
- an inspection system ("PrintInspector", "PI") database 102;
- combined printers and fixtures of the inspection system, 103;
- inspection system run time components ("PI Run Time") linking the fixtures with the network 100, 104;
- labelling software system, 105; and
- a network 110 linking the items 101, 103, 104, and 105.

The inspection system of the invention can comprise distributed components including mainly the fixtures, applications, and databases, some of which are integrated with label design systems. The deployment architectures are flexible. For example, FIG. 5 shows a simple deployment with a printer/fixture 103 linked with an inspection system server 120, in turn linked with a LAN 121 to which a PI DB database 102 is also linked.

FIG. 6 show a further deployment with items 103 each linked directly with an item 104, in turn linked with a LAN 130. An inspection database 102 and an inspection server 131 are linked with the LAN 130 also.

The following describes the deployments in more detail "PI RunTime" is the core host processing software, and it is included in a modular manner in a full inspection system. "PI Prime" is an inspection system which has both label design and inspection design functionality, whereas "PI Flair" is an inspection system which only performs inspection.

PI Prime Deployment Model (FIG. 4)

The system allows corporate level users to be able to design labels and inspections at one or more sites and use those setups at different sites around the world. This means there may be a team of label designers, located at the one or more design site, each responsible for the design of a set of labels. There is a tight integration between the label design software and the design time aspects. It also allows users to test their design and inspection configuration locally on a printer using PI RunTime, and to be able to manage their label designs in a controlled manner.

Having successfully created, tested and approved a given label, the design site will then release that label for use at one or more production sites. At the production sites, there is a centralized control of the PI RunTimes, i.e. it is used to control and monitor jobs on individual RunTimes and to display their results/counts. PI RunTime is capable of presenting detailed inspection results locally, and the labelling software can display overall counts and the status of individual PI RunTimes.

There may be a need to make minor adjustments to the setups to cater for local environmental differences; PI RunTime is responsible for adjustments to the scanner and the labelling software is responsible for adjustments to the printer and inspection setup (via PI Prime). PI RunTime is also capable of temporarily storing/recording data/results in order to gracefully handle intermittent connection issues. This deployment option suits enterprise users who wish to design labels and inspections at one or more sites and subsequently release them for use at production sites located around the world.

A single PI RunTime instance may be required to react to commands from more than one user. For example, it is possible for one or more operators to initiate a print job at the same time or while another job is in progress. Therefore concurrency management is put in place such that PI Runtime handles this issue gracefully.

PI Flair Deployment Models

PI Flair can be deployed in at least two scenarios. One scenario is a 1-to-1 deployment with PI RunTime, as shown in FIG. 5, a single PrintInspector application. In this deployment model PI Flair and PI RunTime reside on a single Vision Processing Unit (VPU) and the PI database resides on a networked server. The database is therefore accessible over the network. The PI database may also be located on the same VPU as PI Flair and PI RunTime. All design time activities are carried out on the VPU using PI Flair. All inspection activities and the presentation of results are carried out on the VPU using PI RunTime.

This deployment suits users who have a single printer, a single PrintInspector VPU and optionally a networked server. This deployment also suits users wanting multiple independent standalone systems, and they can share access to a common database in this scenario.

Another scenario allows a single PI Flair to interoperate with one or more PI RunTimes (each Run Time having its own printer). In this case the single PI Flair will be used to interoperate with all associated PI RunTimes. This deployment model extends the first PI Flair deployment model by allowing multiple PI RunTimes to be deployed on a common network. This model recognizes that the inspection capabilities need to be located at the printer only and that the inspection design features are only required at a central location. All design time activities are carried out in PI Flair. All inspection activities and presentation of results are carried out with individual PI RunTimes.

This option requires PI Flair to provide centralized control of the PI RunTimes, i.e. it is used to control and monitor jobs on individual PI RunTimes and to display their results/counts. Since PI RunTime is capable of presenting detailed inspection results locally, PI Flair supports displaying overall counts and the status of individual PI RunTimes. This deployment option suits users who wish to carry out inspections of labels printed using/on multiple printers.

Irrespective of the deployment configuration, the inspection system in various embodiments checks the labels in-line as they are printed. The system has a scanner, and this may be mounted in a closed loop from reel-to-reel in a printer. This avoids need for the scanner to have its own drive system, and decreases the chance of label warping during scanning. Also, where the scanner is fully integrated it is unlikely to allow ambient light to access the scanner sensors, thereby achieving good quality and repeatability. However, the scanner may be externally mounted on a printer, close to an outlet side and thereby close to an output roller. The system which may be externally mounted is particularly versatile, as it may be mounted on any of a number of printer types in any number of configurations. In this case also, the label is driven by the printer's own mechanism unhindered by the scanner. The label travels under the scanner of the inspection system guided by the hardware in a manner that decreases the chances of label warping. The effect of ambient light is minimized due to the mechanical design having shielding.

In software terms the processor does not perform the prior art approach of image subtraction as this would lead to an excessive number of false fails. For example a single pixel out of place in an unimportant part of the label might give a negative output with an image subtraction testing technique. On the other hand, the processor executes specific tools for each region of the label, each tool having its specific characteristics suited to the associated part of the label, including allowed tolerances and image processing algorithms.

In some embodiments, the tools are developed in label design time as an integral part of the label design process ("PI Prime"). This may involve adapting a tool template with insertion of specific configuration settings such as geometric coordinates and inspection criterion.

The inspection system is well suited to pharmaceutical and medical device labels or any industry where label accuracy is of critical importance. It carries out pre-configured inspections on labels as they are printed to determine whether or not the label was printed correctly. It produces an overall result regarding the correctness of the label. In the event of incorrect/failing labels it highlights the failure reason(s). It is not essential that the label have an adhesive on the back, or indeed that it be on a web.

Development of Inspection Software, Fully Integrated Approach

In these embodiments, a single tool (i.e. the labelling system 105) is used to design a label and to specify the elements of the label that are to be inspected. It also means that starting a batch/print job from within the labelling software will automatically start the inspection. The labelling software is used to view the end results of the inspection (e.g. counts). A "PI" user interface is provided at the printer to view individual label results and to manually accept failed labels.

A fully integrated enterprise system such as the system shown in FIG. 4 facilitates central management, control, design and use of labels, and their inspections, according to a defined business process workflow. It facilitates the design of labels at one location and the use of those labels at other locations. It is used across multiple sites or within a single site. More than one individual is involved in such systems. Integrated enterprise solutions mean deep integration with the labelling software where the inspection configuration is considered to be part of the overall label configuration.

Development of Inspection Software Stand Alone Approach

One tool (e.g. labelling software) is used to design a label and a second tool is used to specify the elements of the label that are to be inspected. Starting a batch/print job from within the labelling software will not automatically start the inspection, e.g. the PI may have to be placed in the correct mode of operation first. The labelling software will not be used to view the end results of the inspection (e.g. counts); this information will only be available from within the inspection system.

A stand-alone multi-user system facilitates the design and use of label inspections within a single site. This involves a two-step design process; the first step is the definition of the label content (performed in an external labelling software application), the second step involves the creation of the inspection configuration, within PI, based on an image of the label (either scanned or obtained from a file). Since there is no integration with the labelling software all inspection configurations are considered to be independent of the actual label, although a means is provided to associate an inspection configuration with a label identifier. It is also possible to automatically load the required inspection configuration based on the label identifier found on the first label.

Single-user systems are geared towards single users operating within a single site where integration into the organization's higher level business processes is not required. A stand-alone single-user system is functionally equivalent to a standalone multi-user system where only a single user has permission to use the system.

Functional Decomposition

Non-Integrated Embodiment ("PI Flair") Decomposition

PI Audit Trail

The PI Audit Trail component is used to record
all critical actions carried out by the user within PI Flair.
all critical actions/decisions made by the PI Flair software.
all critical events occurring in the system.

Where PI RunTime is used in conjunction with PI Flair, the PI RunTime software delegating storage of items/actions/events to PI Flair. In the event of a loss of connection to the PI RunTime, PI RunTime will log audit trail items/actions/events locally; these items/actions/events will then be retrieved from PI RunTime on reconnection and logged as normal.

Audit Trail Report

The audit trail report contains a log of all system activity over a specified time period, including changes to users and products, production statistics, and signoffs.

Batch Report

The batch report contains a breakdown of the inspection failures for each of the inspections performed on the labels in the batch.

Figure 7:
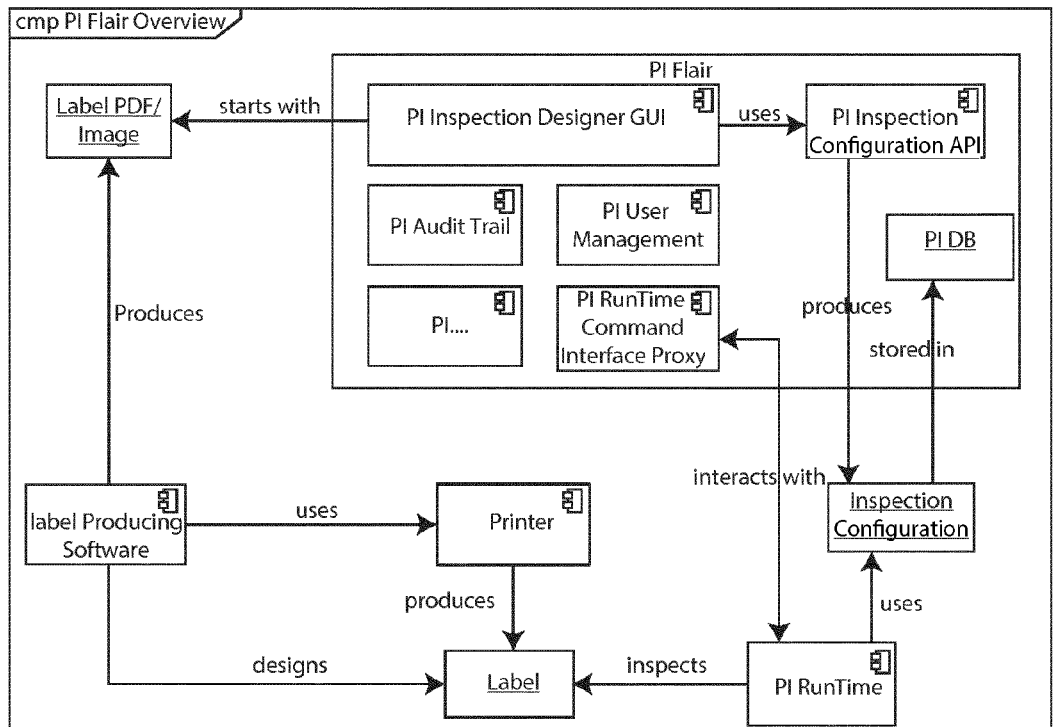
FIGS. 7 to 9 are block diagrams of the systems, and also showing flows between system components.

FIG. 7 gives an overview of the major components associated with PI Flair. The PI Inspection Designer GUI component accepts an image of the label from the software application used to design the label. Alternatively, it may be obtained by scanning the label, using PI RunTime, as it is printed.

Within the PI Inspection Designer GUI, the user highlights the various regions in the label that are to be inspected and specifies the necessary inspection details/properties. The PI Inspection Designer GUI uses the PI Inspection Configuration API to capture these details and to set up an Inspection Configuration, which is stored in the PI DB. The PI User Management component controls user permissions within the inspection system. It records all critical actions carried out by the user. The PI RunTime Command Interface Proxy interacts with PI RunTime. Although the Inspection Configuration is created within the inspection system and is stored within the PI DB it is not shown within PI Flair's boundary in FIG. 7. This is because it is also used by PI RunTime and is shown as such.

The PI RunTime is an independent entity capable of interoperating with software of various inspection systems of the invention such as those referred to as "PI Flair" and "PI Prime" (fully integrated system embodiment). A single underlying format is used by PI Prime, PI Flair and PI Runtime to describe Inspection Configurations.

PI Prime Decomposition

Figure 8:
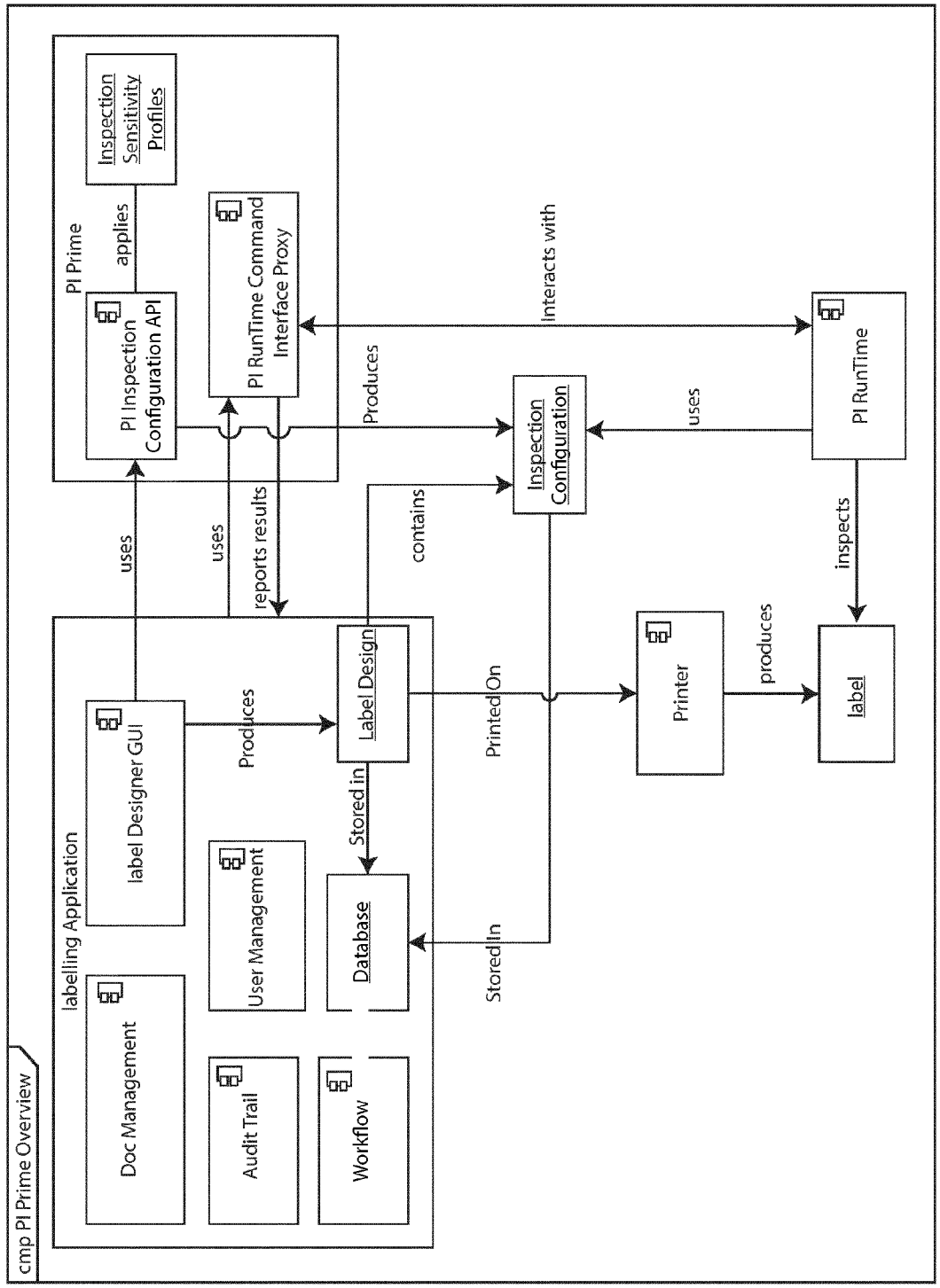

FIG. 8 gives an overview of the major software components of the system referred to as "PI Prime". The label designer GUI component is responsible for the design of labels, in which the user highlights the various items of the label that are to be inspected and specifies the necessary inspection details/properties. The Label Designer GUI uses the PI Inspection Configuration API to capture these details and to set up an Inspection Configuration. The Label Designer GUI component captures the details of the design of the label in a Label Design object. This object also contains the Inspection Configuration, either directly or by reference. Both the Label Design object and the Inspection Configuration are stored in the database DB. The PI RunTime Command Interface Proxy is used to interact with PI RunTime.

Since the PI Inspection Configuration API and the PI RunTime Command Interface Proxy are common to PI Prime and PI Flair they is designed to work in both scenarios, i.e. there is only one PI Inspection Configuration API component code base and only one PI RunTime Command Interface Proxy component code base.

PI RunTime Decomposition

Figure 9:
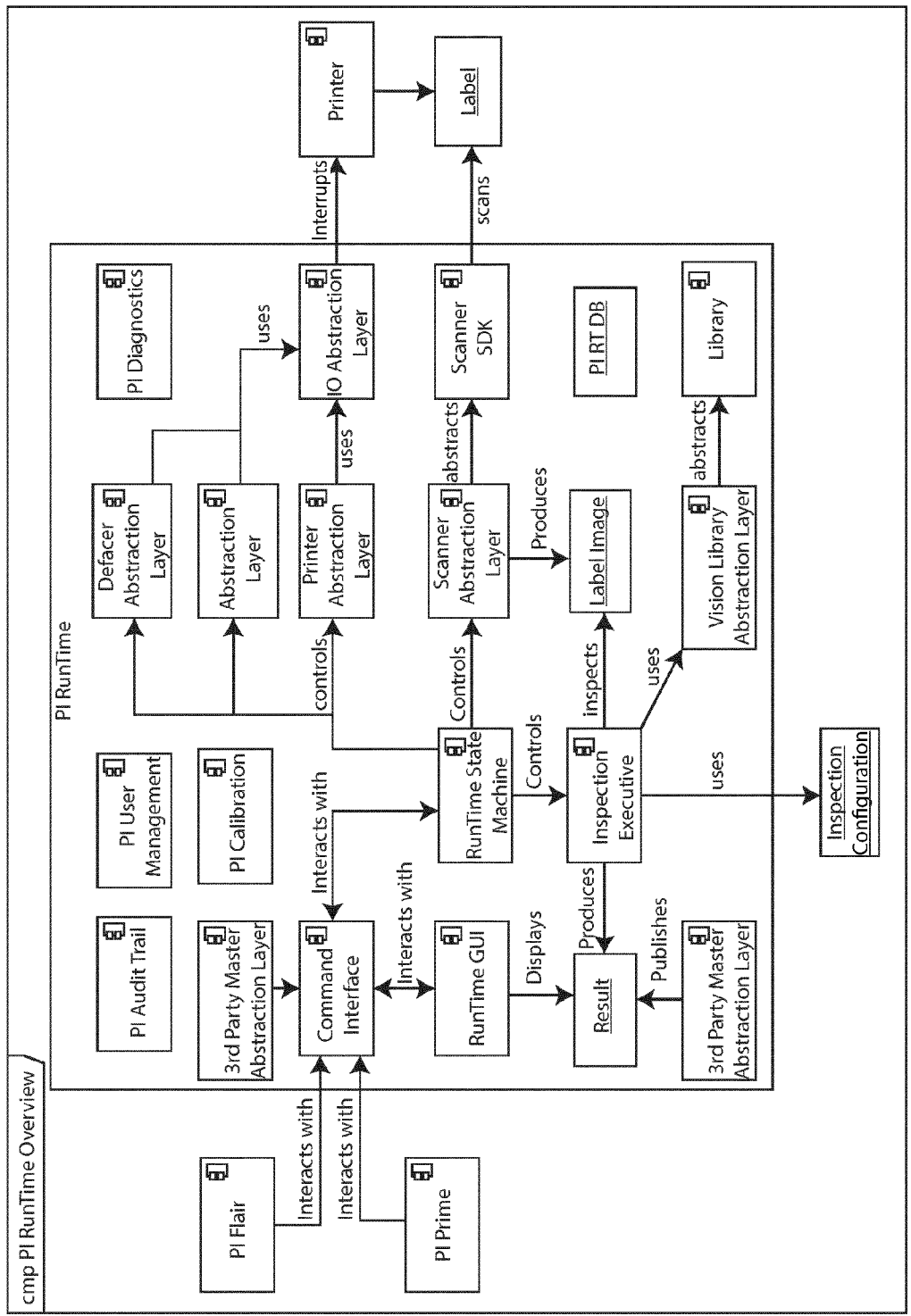

FIG. 9 gives a high level overview of the major components of PI RunTime. The RunTime State Machine component is responsible for the overall control and sequencing of the PI RunTime. During normal operation it is responsible for sequencing the scanning of labels, the execution of inspection configurations and the control of printing. It is also responsible for appropriately reacting to higher level commands.

Coordinate Transformation

For translation of position and dimension co-ordinates to PI RunTime's image co-ordinates, the following formulas are applied:

Position Transformation:

$$Px=(Lx*Dmm)+LOL$$

$$Py=(Ly*Dmm)+LOT$$

where,
(Px, Py): Scanner image coordinates in pixels
(Lx, Ly): Label coordinates in mm
Dmm: Dots per mm (DPI/25)
LOL: Label Offset Left (Pixels)
LOT: Label Offset Top (Pixels)

Dimension Transformation:

$$Ph=Lh*Dmm$$

$$Pw=Lw*Dmm$$

where,
(Ph, Pw): Scanner image height & width in pixels
(Lh, Lw): Label height & width in mm Label Composition Inspection of a label includes verifying that a scanned image of the printed label contains a defined set of "regions" and that each of those regions is correct. A region is deemed to be correct if it is located in the correct position, is of the correct dimension, and contains the correct information. A region is considered to be in the correct location if it is located where the designer requires it to be located, and to be of the correct dimension if its height and width equal that which the designer requires them to be. A region is considered to contain the correct information if its content matches that which the designer requires it to contain. Although the primary function of PI RunTime is to inspect printed labels, it is recognized that since images can be captured of more than just labels and since PI RunTime's capabilities are applicable to more than just scanned labels, the software is constructed in a manner that does not restrict its use/application to images of scanned labels only.

Sample Label

Figure 10:
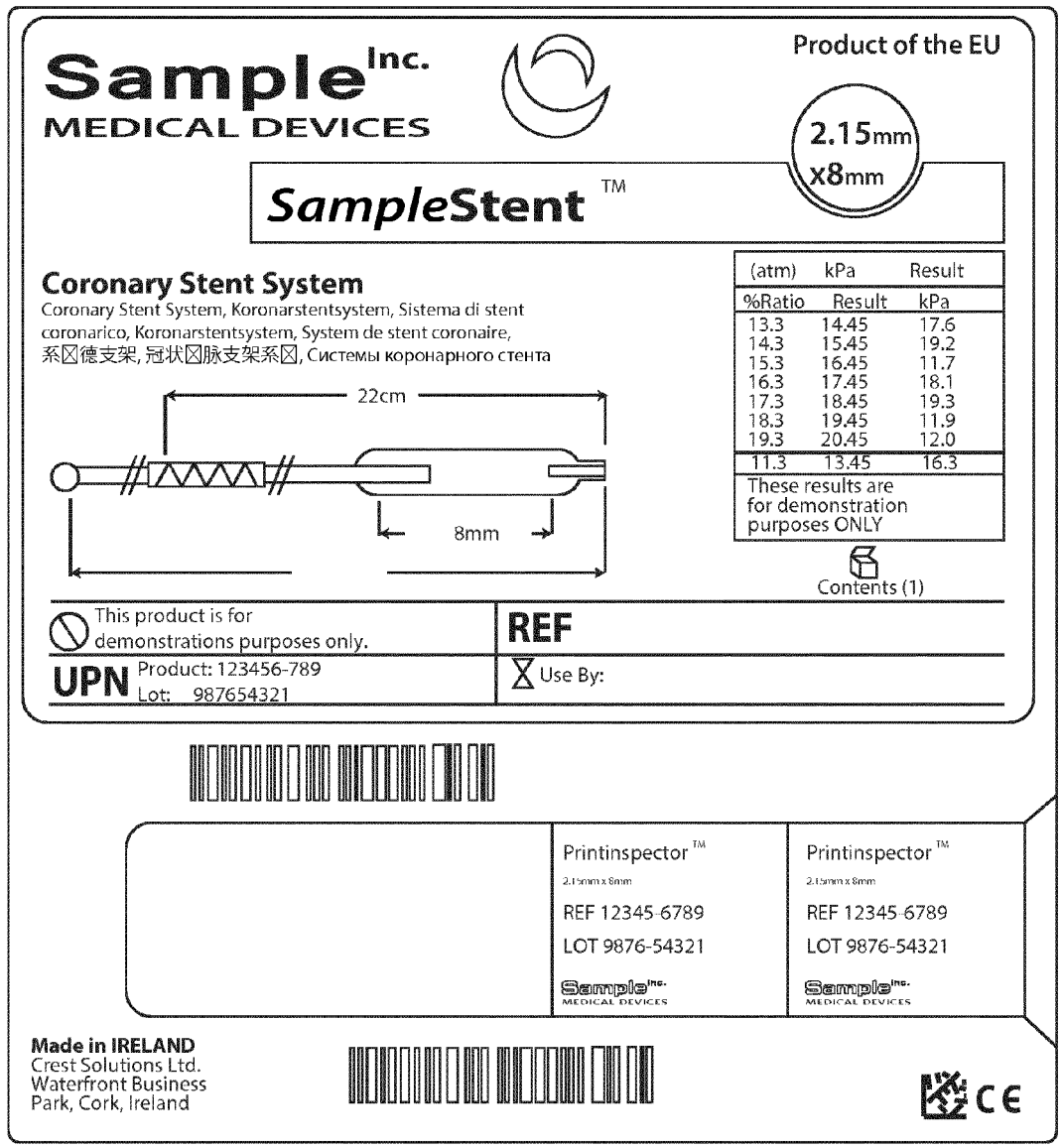
FIG. 10 is a view of a sample label.
Figure 11:
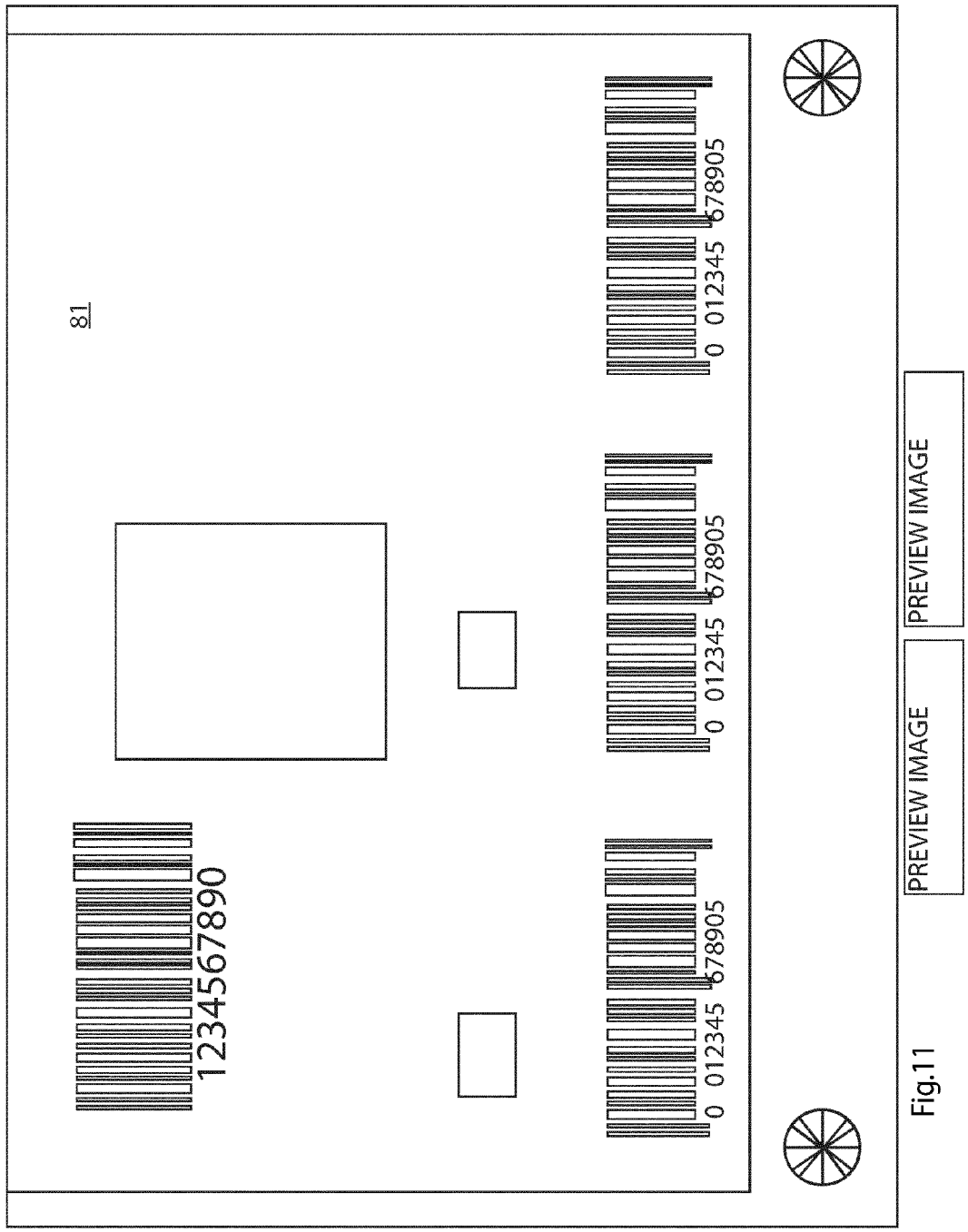
FIG. 11 is a view of a calibration label.

FIG. 10 shows a typical label, in which there are several regions of varying importance. FIG. 11 shows a calibration label which is used for focusing of the scanner with head adjustment.

Referring particularly to FIG. 10, the image has multiple regions to be inspected. The system stores an electronic image and a description of the inspection regions. A significant difference between a scanned image and an electronic image is the gradient of the curve associated with the white to black (and vice versa) transition at the edges of inspectable items. For an electronic image the edge/transition is a step-like change, while for a scanned image it has a gentler slope (the angle of the slope being governed by both the quality of the print and of the scanner). The net effect of this difference is that an inspection setup on an electronic image can fail when applied to a scanned image, whereas inspections setup on a scanned image typically work very well on other scanned images of the same label type. In order to cope with this effect inspection profiles and tolerances are used.

Reference Image Label Model

PI Flair uses a reference image of the label as its starting point, the model of which is as shown in FIG. 12. For PI Flair the reference image can be either a scanned image or an image loaded from a file. The image loaded from a file could be either scanned or electronic (depending on its origin and the user). The PI Flair reference image caters for both scanned and electronic images.

PI Prime's starting point is an electronic reference image. Labels can be described in an abstract fashion which allows users to setup label formats where various blocks are positioned on the label but their content is left blank. These formats can then be used as the basis for actual labels and the final content of those blocks is specified at that level. This gives rise to the label model shown in FIG. 13. The manner in which labels can be constructed is highly flexible and allows users to construct labels and label families according to their needs. FIG. 13 shows one way in which label families can be constructed and understood from an external point of view.

A "format label" defines the basic structure, layout, dimension, content, etc. of a family of labels. This ensures a high degree of commonality between all members of the family Very little generic detail is defined in the format label apart from, for example logos, branding, common descriptions, etc. The format label is therefore mostly composed of variable placeholders, each of which may be either an image placeholder, a text string placeholder, a barcode placeholder, a line, a box or a circle. The location, dimension and some additional information for each of these placeholders is specified at the format label level. These placeholders collectively form the set of variable data associated with a format label.

Beneath the format label is the "product label". Each product label can be viewed as an extension or specialization of the format label. Product labels specialize the format label for a specific product, e.g. the product name for each member of the family may be different but they will all be located at the same position, have the same font, etc. For each product label there is a set of product level placeholders. The difference between the product level placeholder and the variable placeholder is that the specific detail of the product level placeholder is known at design time and can thus effectively be considered to be static data for that particular product label. The set of product level placeholders associated with a product label is known as the product data. Although the product data is known at design time, it is not generally inserted into the product label until print time. However, it is possible to generate product labels in advance of print time to be passed to the inspection system.

Sample batch data can also be inserted at this point. These features are used to test inspection configurations prior to their release to production.

The final layer in the hierarchy is a "batch label". The batch label can be seen as a specialization of the product label. The batch level variable data is captured as a set of batch level placeholders, collectively known as the batch data. The difference between product level placeholders and batch level placeholders is that the detail/content of the batch level placeholders is never known until print time and furthermore its detail is often specified by an ERP system. Batch level variable data is typically a set of text strings and barcodes. Occasionally however it can also consist of a set of images, e.g. the CE mark or logo may be different depending on where the product label is printed. The batch level is particularly suited to serialization, in which the inspection system is able to check individual serial numbers or codes for each label.

In one embodiment, PI Prime uses an electronic reference image of the label as its starting point, and the model given in FIG. 13 is used to capture this information.

Label Inspection Configuration Model (FIG. 14)

An inspection configuration specifies the inspection(s) to be carried out on a given label. Inspection configurations exhibit a structured layered hierarchy with each layer containing one or more inspection definitions. PI RunTime is responsible for carrying out inspections as defined according to this model. Each inspection configuration is uniquely identified, and contains the reference image upon which the inspection definitions are built. The unique identifier is used to ensure the correct inspection configuration is loaded by PI RunTime. The inspection configuration also contains multiple different layers of inspection definitions. While each layer type is given its own container, all layers are identified, named, and structured in a common way. Each layer holds the collection of inspection definitions to be applied at that layer.

Label Inspection Definition Model (FIG. 15)

Each inspection definition (see FIG. 15) is uniquely identified. These identifiers are used in the recording of results for traceability purposes. The type of inspection is captured. The location and dimension of the inspection definition specifies the region of the scanned image to which the inspection definition will apply.

The inspection definition also declares whether or not there is variable data associated with the inspection and the type/details of that variable data. For variable data images it is possible to use either a scanned image or a reference/electronic image Since more than one variable data image can be included in the definition, e.g. batch data images, it is possible to specify which image should be used for a given print job. Inspections include the expected format of the string to be inspected as well as the actual detected string content and a font descriptor. A serialization descriptor is used to hold the details of the serialization and randomization inspections, including for example the list of strings and images to expect. Optical Character Recognition (OCR) technology is used not only for recognising characters, but it is also developed for verifying full strings.

Regarding inspection profiles, it is possible to attach an inspection profile to an inspection definition. The detail of the inspection profile for a given inspection definition is obtained from the inspection context. Since the profiles are used to hold the parameters of the inspection types (and consequently the parameters of specific vision tools) the detail of each inspection profile is specific to the inspection type, e.g. there is a specific "High Sensitivity" profile for "Verify Text", another for "Coarse Graphic".

In tandem with the inspection profile, each inspection definition also contains an inspection tolerance. The inspection tolerance is used to specify the tolerance associated with the inspection's location and dimension. This mechanism facilitates the creation of search regions that are less tightly defined than the equivalent print regions and therefore aid in compensating for movement in label elements as witnessed by the scanner. The inspection tolerance is specified as a multiplier. Its effect is to cause the search area to change its top X, Y and width, height values by a multiple of 1 pixel each; X and Y are decreased by the tolerance value, and the width and height are increased by twice the tolerance value.

Regarding the inspection algorithm wrapper, its function is to wrap the actual inspection algorithm used to carry out the inspection. The actual inspection algorithm specifies the details/algorithm associated with the inspection type. The wrapper provides the necessary functionality to enable application of the inspection profile, specification of the variable data and retrieval of the inspection result—note that these are primarily RunTime concerns.

Each inspection definition also contains a result object, which is used to hold the overall result of the inspection definition as well as the scores of each parameter achieved by the inspection. It is possible to create or adapt inspection profiles at design time based on these scores.

Figure 16:
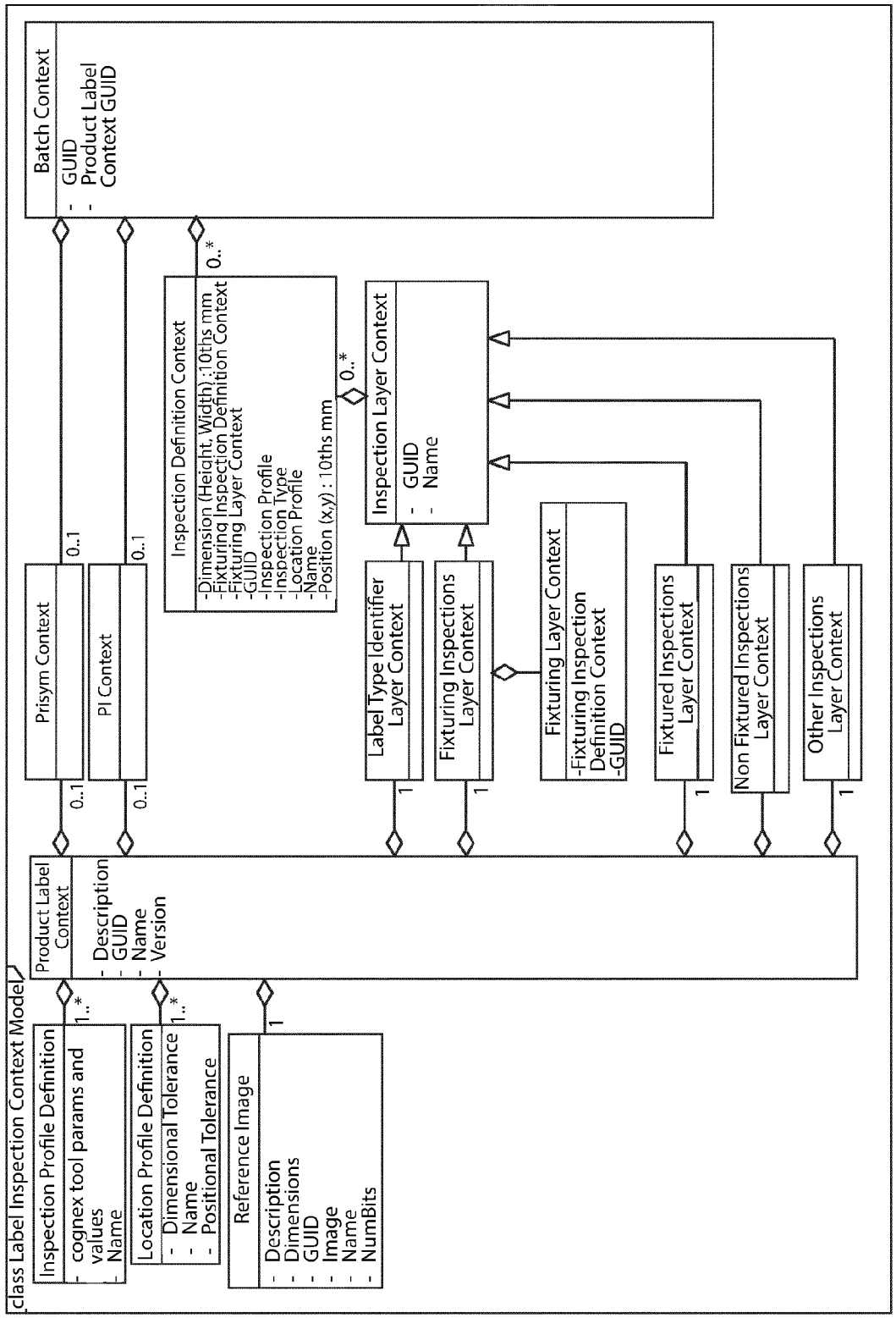

Label Inspection Context Model (FIG. 16)

In the case of PI Prime, in order to construct a PI RunTime compliant inspection configuration, the system provides a description of what must be put in the RunTime compliant inspection configuration. This description is known as the inspection context and is a structured, layered and hierarchical description of the required inspection definitions.

There are two forms of inspection context. Product label contexts describe inspection configurations at a product label level and are used at design time. Since batch level variable data shall not be specified until print time, a second inspection context, the batch context, is used to describe the inspections associated with the batch data During design time, as part of setting up a label, the product label contexts are created. PI Prime is responsible for converting these contexts to PI RunTime compliant inspection configurations. The PI RunTime inspection configurations are associated with specific product labels and stored accordingly. At print time, the PI RunTime inspection configuration is retrieved, the batch context is constructed and they are passed to PI Prime at the start of a print job. PI Prime then converts the batch configuration to a PI RunTime compliant version and forwards both it and the RunTime compliant inspection configuration to PI RunTime where they are combined and readied for execution. This mechanism permits the PI RunTime to cache PI RunTime compliant inspection configurations such that for repeated/recurrent print jobs of the same product label only batch related information needs to be downloaded to PI RunTime.

FIG. 16 gives a high level overview of the structure of the label inspection context. The inspection context is constructed in a manner that facilitates an easy mapping to the PI RunTime compliant inspection configuration and contains at least all the data required to generate the inspection configuration.

The product label context is uniquely identified, has a name, description and version number, and these are used to create the equivalent entries in the inspection configuration. The reference image upon which the inspection definitions are built are also included and described in terms of dimensions and engineering units. The inspection profile definitions contain the set of parameters and their concrete values for a given inspection type. In one embodiment, each inspection profile definition used and referenced in the label context is fully defined as part of that context. Specifying the profiles in this manner allows the profiles to remain label-specific while at the same time being independent of the PrintInspector. Furthermore, it still allows for the controlled management of profiles in the PI RunTime to apply a scaling factor to each of these inspection profiles to account for the local tuning/calibration of the PI RunTime system. The location profile definitions allow for label-specific location and dimension tolerances to be applied. They are managed in a similar manner to the inspection profile definitions. The labelling software context allows the labelling software to include any extra information that it may need for whatever purpose, in the context. PrintInspector is not required to understand, use, or interpret, this information. The PI context is used to provide the same functionality for PrintInspector.

Regarding the definition of inspections to be carried out, these are structured in a similar manner to that specified for the RunTime compliant inspection configuration, i.e. multiple different layers of inspection definitions are provided. Each layer is given its own container and all layers are identified, named and structured in a common way. Each layer holds the collection of inspection definition contexts applicable to that layer. The inspection definition contexts are used to describe the particulars associated with each inspection definition (see below).

All printing processes have a certain amount of variability that must be accounted for in industrial vision. Such variability may manifest itself as follows: a printer which prints variable data on to a defined template will show drift between the over-printed text and codes, and the pre-printed borders and graphics. These two layers can be treated independently of one another in which case the system will not detect any misalignment between the pre-print and over-print. In order to check that the pre-print and over-print are aligned correctly then at least some over-printed data should be fixtured off pre-printed data; a conveyed system will have units which aren't uniformly aligned as they pass in front of a camera; these examples, as with all printed output and image acquisition, have an additional variation when multiple systems are involved as no two printer-scanner or conveyor-camera systems are identical. An operator performing manual inspections will often ignore this variability but a robust image inspection system must identify the differences and adapt to them.

PI takes this variability into account by a process known as "fixturing". Fixturing makes use of one or more features, used as anchoring points, on an acquired image to detect and counteract any distortion caused by effects such as label skewing, sliding, buckling or stretching. By defining the location and dimension of inspections relative to such fixturing points inspections can thus be reliably performed on the required regions of the image. PI supports both single point fixturing and n-point fixturing (the process of combining multiple fixture points in a single tool). Advantageously, determination of the position of a single region allows the system to deduce the locations of the other regions on the basis that they are all subject to the same key or offset characteristics.

Because Inspection Definition Contexts can be shared by Fixturing Layer Contexts, the Inspection Definition Contexts are held by the Fixturing Inspection Layer Context, and the Fixturing Layer Contexts reference those that they use. This is shown in the tree view outlined below.

| Fixturing Layer | Fixturing Inspections Layer Context |
|---|---|
| Fixture 1 | Inspection Definition Context |
| Fixture 2 | Inspection Definition Context |
| Fixture 3 | Inspection Definition Context |
| Fixture 4 | Inspection Definition Context |
| Fixture 5 | Inspection Definition Context |
| Fixture 6 | Inspection Definition Context |
| Fixture 7 | Inspection Definition Context |
| Fixture 8 | Inspection Definition Context |
| Pre-Print Layer | Fixturing Layer Context |
| | Fixture 1 reference |
| | Fixture 2 reference |
| | Fixture 3 reference |
| | Fixture 4 reference |
| Over-Print Layer | Fixturing Layer Context |
| | Fixture 5 reference |
| | Fixture 6 reference |
| | Fixture 7 reference |
| | Fixture 8 reference |

Figure 17:
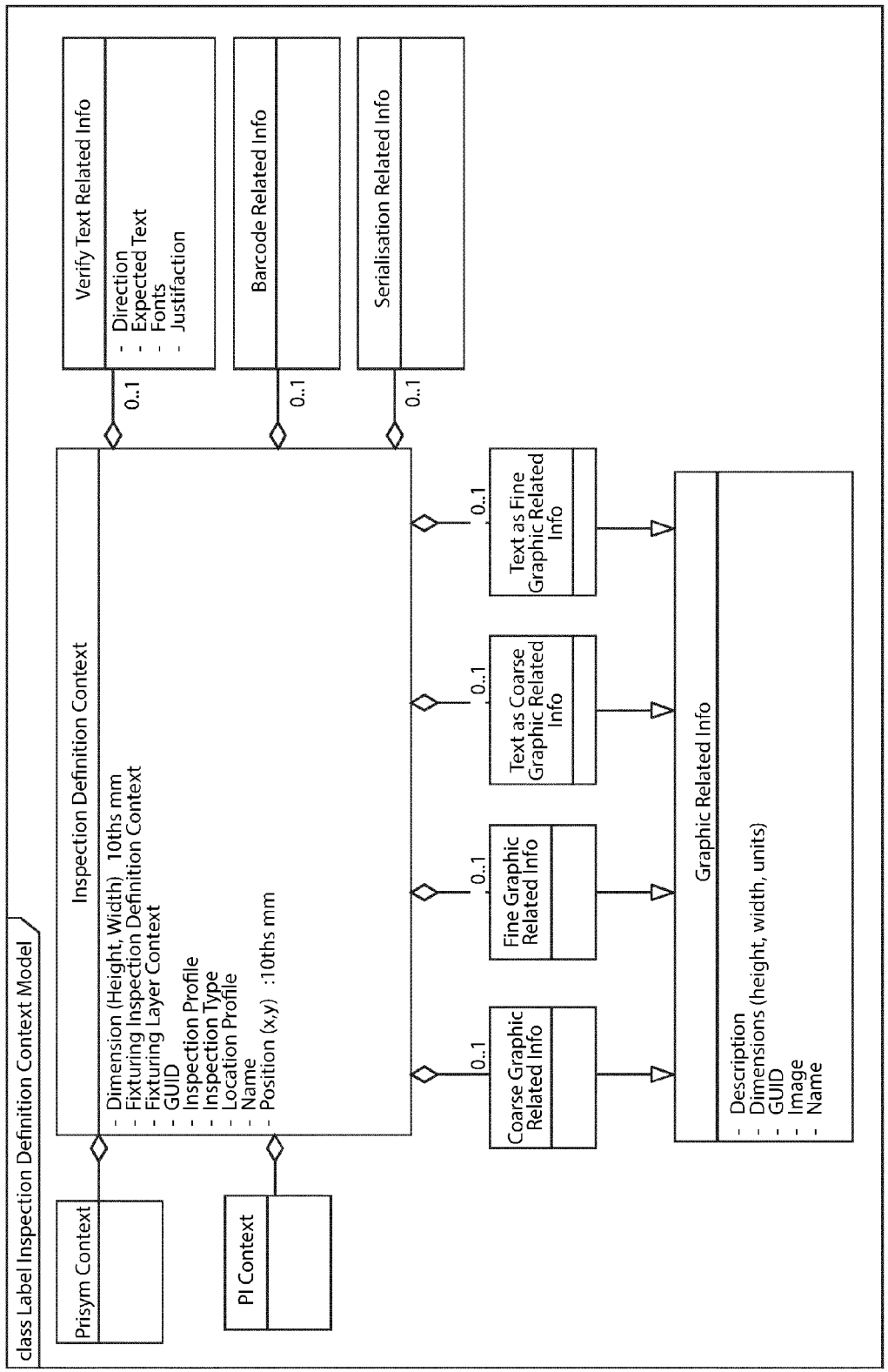

Regarding batch contexts, they are uniquely identified and also identify the product label context to which they belong. They contain a collection of inspection definition contexts describing the batch level inspections to be carried out. Since each inspection definition context is uniquely identified and since batch level inspections are typically not defined until print time, it is necessary for each inspection definition context to identify its fixturing layer context or fixturing inspection definition context (where fixturing is used). FIG. 17 gives a high level overview of the structure of the inspection definition context. The inspection definition context is constructed in a manner that facilitates an easy mapping to the PI RunTime compliant inspection definition and shall contain at least all the data required to generate the runtime inspection definition.

Each inspection definition context is uniquely identified. These identifiers are used to link inspection definitions to their fixturing layer context and fixturing inspection definitions. The location and inspection profiles to be used are specified and refer to those contained within the associated higher level product label context. The type of inspection to be carried out and its region of interest (position and dimension) are specified. Inclusion of PI and labelling software contexts on a per-inspection definition basis is supported.

Regarding image/graphic related inspections, each is uniquely identified, named and described. The image used to train the inspection is provided as a bitmap image and its dimensions and colour depth are specified. This image is an accurate representation (e.g. a bitmap) of the image that is sent to the printer for printing and as such constitutes an ideal electronic image.

Regarding text verification inspections, the expected text, its font, direction and justification is specified. With regard to batch/label variable text inspections it is possible to describe the expected string using a mask-like expression. For example, the expected text shall fit to the mask "ABC-###-DEF" where every occurrence of the text will contain "ABC-" and "-DEF" and the ### will contain a number from a specified range; the range being supplied as a collection of allowed values. Provision is also made to include a regular expression type description of the expected text.

Regarding serialization and randomization related inspections, a serialization data set is provided that describes the list of variable data items. In both cases the actual data, i.e. the elements of the serialization data set, may be either text or graphic related and are specified as described above. Typically serialization involves individually uniquely identifying each label which is to be inspected.

Hardware Platform

Figure 18:
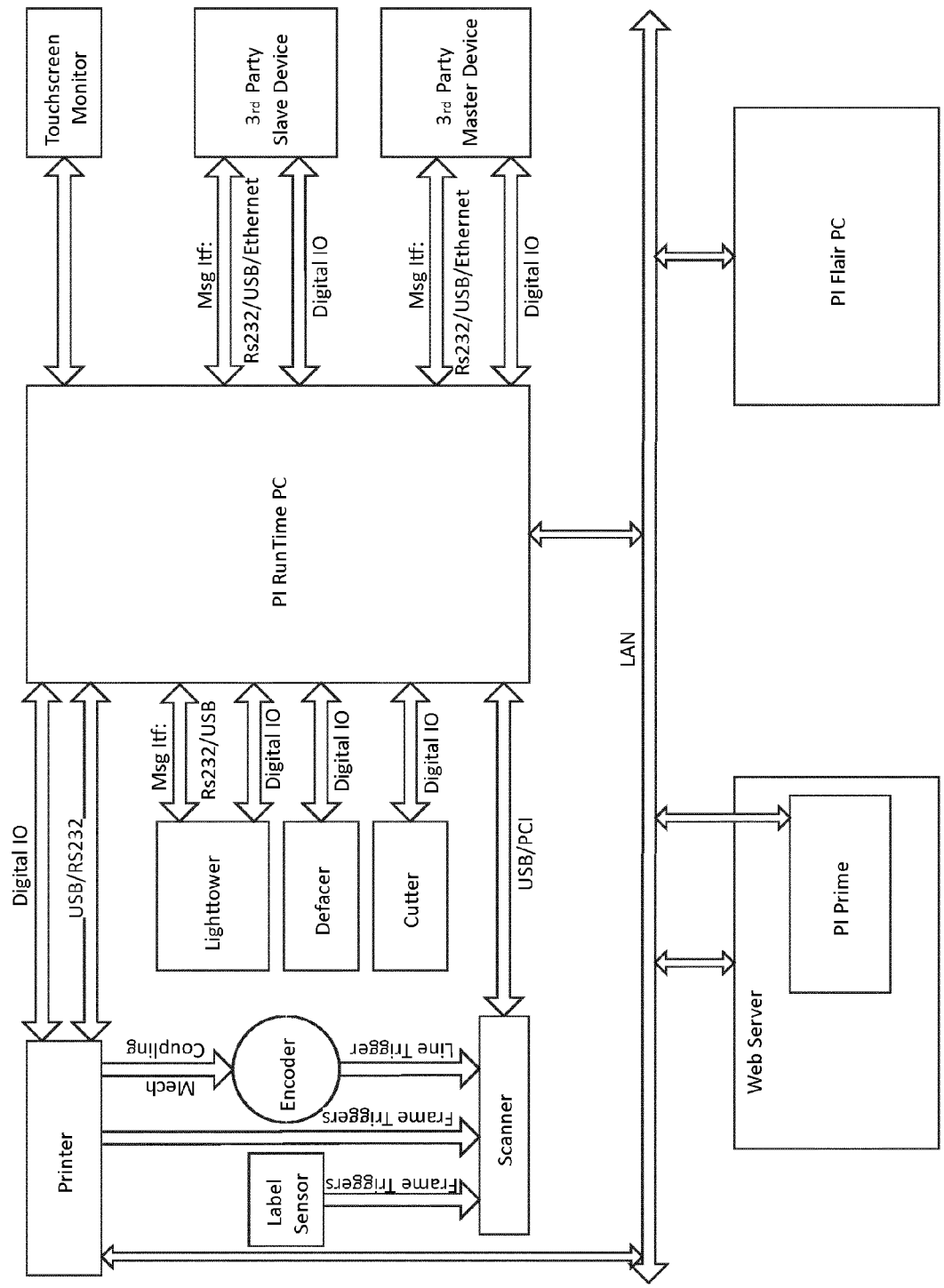
FIG. 18 is a diagram of the hardware architecture of the test system.

As noted above, FIG. 18 gives an overview of the hardware elements of the inspection systems 1 and 50, including both the fixture components and those located away from the printer. The specification of each element involved is given below.

Runtime State Machine

The RunTime State Machine component is responsible for the overall control and sequencing of the PI RunTime. During normal operation it is responsible for sequencing the scanning of labels, the execution of inspection configurations and the control of printing. It is also responsible for appropriately reacting to higher level commands, e.g. from the GUI, PI Flair, PI Prime, etc.

Figure 19:
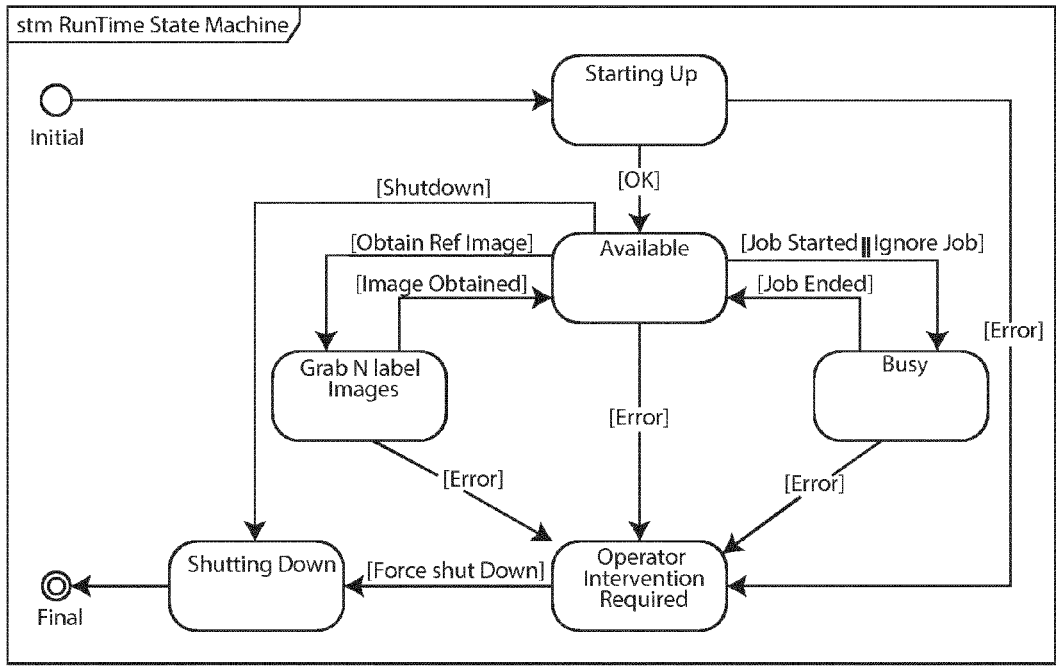
FIGS. 19 to 24 are flow/state diagrams for operation of the test system in various embodiments.

FIG. 19 sketches the overall state machine that is provided by this component. This state machine directly reflects the externally experienced behaviour of PI RunTime. The primary states of PI RunTime are as follows: On power up, PI RunTime enters the Starting Up state where it performs a series of power-on self tests including for example ensuring the connections to the attached peripherals are operational. In the event of an error during this state the PI RunTime transitions to the Operator Intervention Required state.

Upon successful start-up, the system enters the Available state. The Available state is somewhat akin to an Idle state in the sense that it is the primary state from which all other major states of the system can be reached. This state is a hierarchical state in the sense that it possesses several sub-states (see FIG. 20).

When a job is started, the system transitions to the Busy state. It is only possible to carry out that job during the Busy state. It is only possible to transition out of the Busy state when the job is ended or in order to transition to the Operator Intervention Required state due to an error. Note that the client can also command the PI RunTime to ignore a job, i.e. to unblock the printer and to not inspect what is being printed. This state is a hierarchical state in the sense that it possesses several sub-states (see FIGS. 21 and 22).

The Shutting Down state is provided in order to shut down the system in an orderly controlled fashion. From within the Available state, it is possible to initiate a PI RunTime shut down via a user interface button. Pressing this button causes the system to transition to the Shutting Down state. On entry to this state, PI RunTime shuts down all attached peripherals (except the printer), writes all necessary data to disk, notifies the attached client (PI Flair or PI Prime) that it is shutting down and finally shuts down the PC. Note that in the event of forcing a shutdown from the Operator Intervention Required state, the client is notified of the termination of any on-going job and the current related counts.

The Grab N Label Images state is provided to facilitate grabbing a set of scanned images of printed labels. These scanned images can then be used as reference images in PI Flair when creating inspection configurations. PI Prime and hence the labelling software can also avail of this functionality. It is possible to grab multiple images in this state. It is only possible to transition out of this state when the images have been grabbed or in order to transition to the Operator Intervention Required state due to an error. This state is a hierarchical state in the sense that it possesses several sub-states The Operator Intervention Required state is provided to handle scenarios not easily resolved by software alone or where it is preferable to involve the user in the decision process.

Available State

Figure 20:
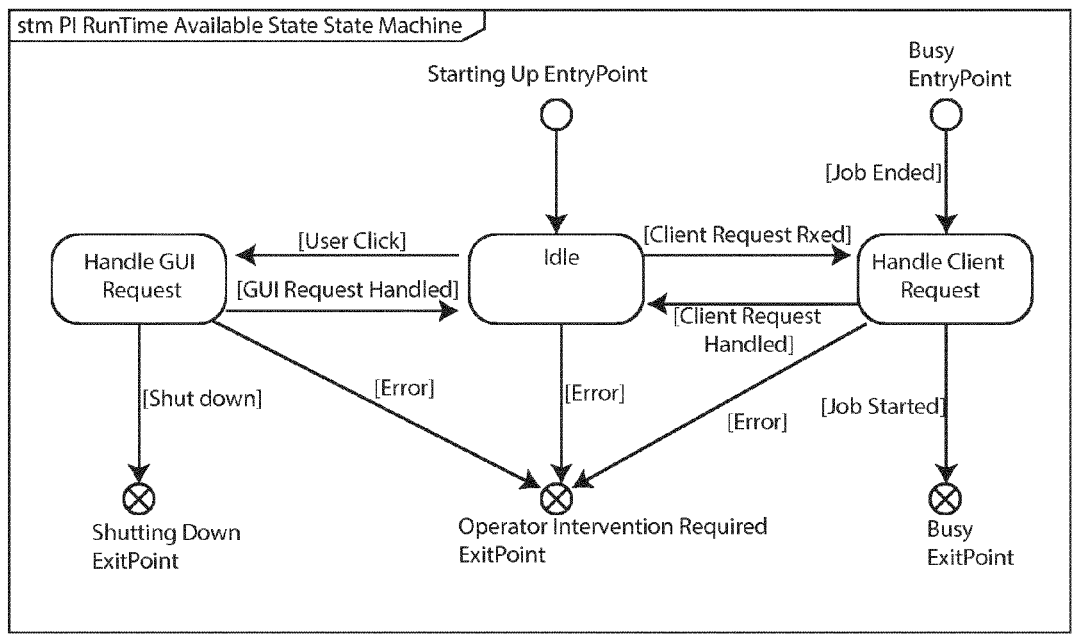
Figure 21:
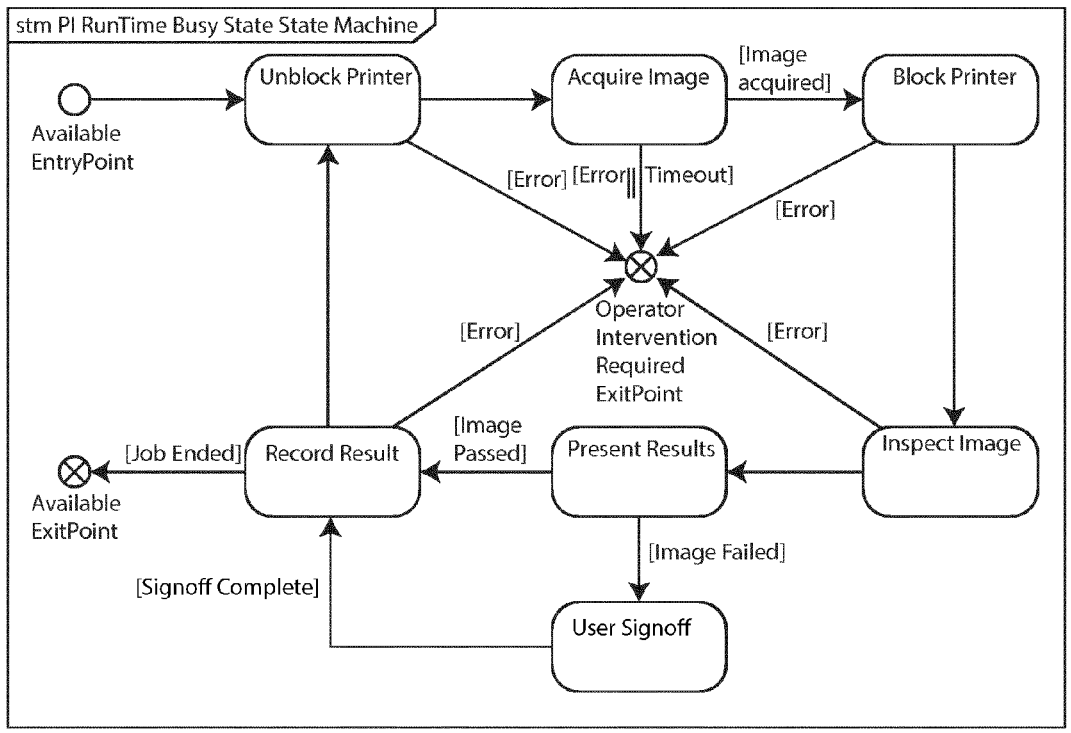

FIG. 20 shows the internal state machine associated with the Available state. This state machine governs the exposure of functionality to the user while the system is not carrying out any jobs. The states of this state machine are as follows. While in the Idle state the system waits for either a user click or a client request to be received. On receipt of a request from the client, the system transitions to the Handle Client Request state. The figure shows how successful receipt of the start job request causes this state machine to exit at the Busy ExitPoint; the top level state machine then ensures that the system transitions to the Busy state as shown in FIG. 21. On return from the Busy state, the Handle Client Request state is re-entered and thus causes transition back to the Idle state. GUI requests/clicks is handled in a similar fashion. The occurrence of an error will cause this state machine to be exited via the Operator Intervention Required exit point. A client request to obtain reference images results in a transition to the Grab N Label Images state.

Having transitioned to the Handle Client Request state PI RunTime is considered to be locked by the originating client. The PI RunTime remains locked until it transitions out of the Handle Client Request state. This locking is used to ensure complete requests, which may span multiple transactions, are not interrupted or interleaved with requests from other clients. This mechanism is provided in order to address any possible concurrency related concerns that may arise due to the fact that multiple clients may attempt to access a single PI RunTime.

Busy State

FIG. 21 shows, at a high/informational level, the internal state machine associated with the Busy state. This state machine governs the execution of jobs while the system is in the Busy state. The states of this state machine are as follows: On entry to the Busy state, from the Available state, the printer is unblocked and the state machine enters the Acquire Image state where it waits for an image to be acquired. Having acquired the image the printer is immediately blocked. The system does not wait indefinitely but rather for a configurable time. Failure to acquire an image, due to error or timeout, results in exiting the state machine at the Operator Intervention Required exit point. Note that an error in any other state will also result in a similar action. Note also that not all error transitions are shown in the figure for reasons of clarity.

Having inspected the image, the results are presented on the user interface. If the image failed inspection, the user is required to sign-off on the inspection before the result is stored. The results are stored immediately for passing inspections. The above described loop is then repeated until the job has ended. PI RunTime ensures that the printer is blocked when the job is ended before exiting this state machine. While in the Busy State it is possible for the client to cancel/terminate the print/batch job and return to the available state.

A request from the client to ignore a print job is handled as follows:
 On entry to the Busy state the printer is unblocked.
 On receipt of the job end request, the printer is blocked,
  and PI RunTime returns to the available state.

While the foregoing describes the various associated sub-states of the Busy state at a high level, it is important to put this state machine in context with the print modes. The station pipeline implies that more than one label will be travelling through the pipeline at any given point in time. It is critical to understand therefore that the above state machine describes the sequence from the point of view of a single label only; it does not account for the natural pipeline present in the system; although it does provide a good understanding of the basic operation.

Provided the image is inspected quicker than it is printed there is no need to stop the printer while inspecting the image. However, this is a function of the print speed, the size of the label and the number and type of inspections to perform on each label.

The main difference between a good and a bad label is the necessity to stop the printer while waiting for the user to sign-off the label, i.e. to accept or reject the failure. Consequently this is taken into account when determining the overall stopping/releasing of the printer.

Operator Intervention Required State

Figure 22:
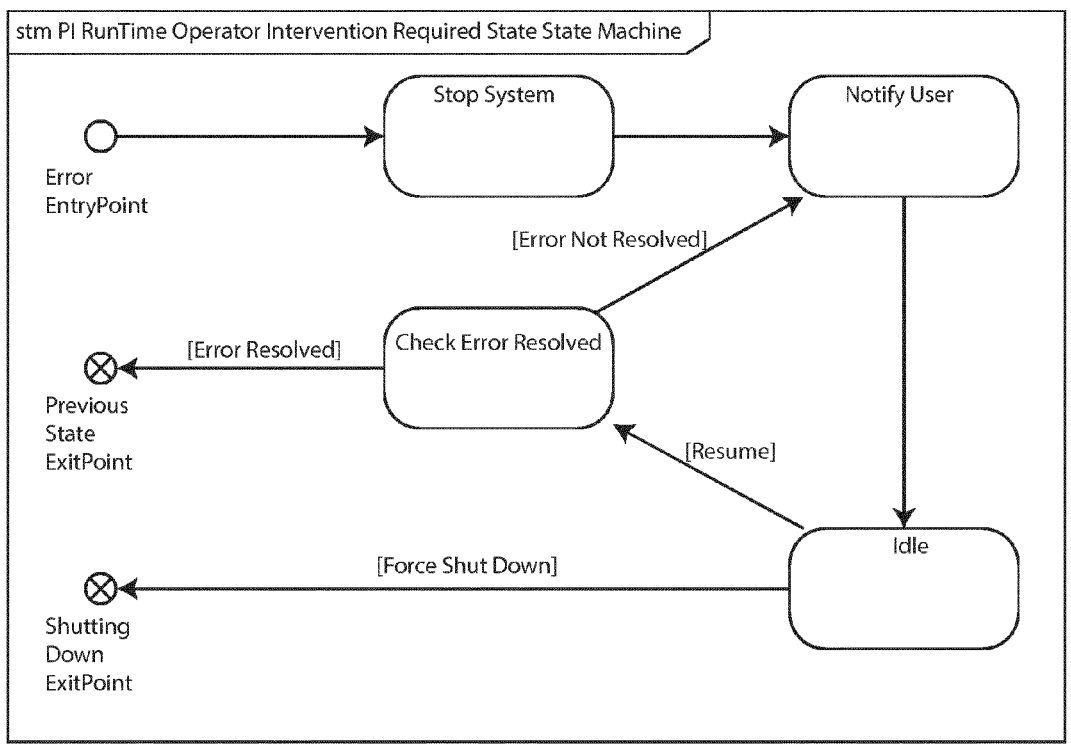
Figure 23:
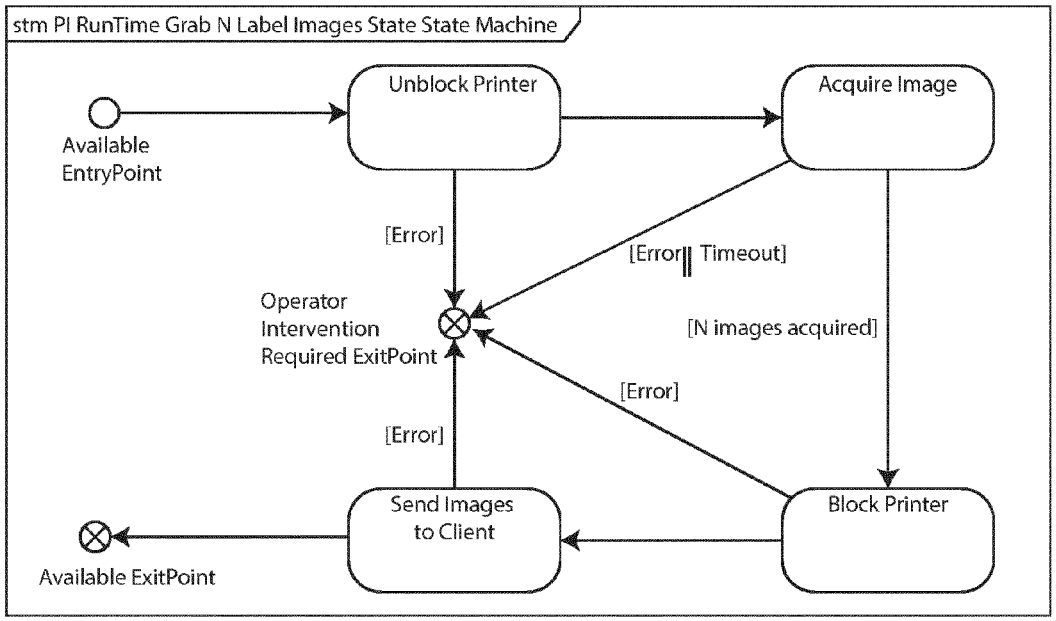

FIG. 22 shows the internal state machine associated with the Operator Intervention Required state. The states of this state machine are as follows: On entry to the Operator Intervention Required state, due to an error from any other state, the system is first stopped, i.e. the printer is stopped, the defacer left in its current state and the third party master and slave device interfaces driven appropriately. The user is then notified that the system has entered the User Intervention Required state via the light-tower and the GUI. PI RunTime then idles indefinitely waiting for the user to command it to resume operation.

When commanded to resume operation, PI RunTime first validates the user's permission to do so before checking that the original error has been resolved. If the error was resolved the system restores the printer to its original operational status (e g running or stopped) and returns PI RunTime to its previous operating mode. If the error was not resolved, PI RunTime informs the user and continues idling.

While PI RunTime is idling, i.e. waiting for the user to command it to resume, it is possible for the user to command it to shutdown gracefully. Note that the idle state is local to the Operator Intervention Required state and should not be confused with that shown in FIG. 20.

Grab N Label Images State

The states of this state machine are as follows:

On entry to the Grab N Label Images state, the printer is unblocked and the state machine enters the Acquire Image state where it waits for the required number of images to be acquired. The system does not wait indefinitely but rather for a configurable time. Failure to acquire an image, due to error or timeout, results in exiting the state machine at the Operator Intervention Required exit point. Note that an error in any other state also results in a similar action.

The printer is then blocked again and the acquired images forwarded to the client. Having forwarded the images to the client, PI RunTime returns to the Available state. While in the Grab N Label Images state, it is possible for the client to cancel the complete operation and return to the available state. Regarding the actual label that is printed, it is up to the user to cause a label to be printed or some other labelling/printing software application. The user takes this action after PI RunTime has entered the Grab N Label Images State. Note that the user could simply cause the printer to feed a label through the scanner and in this way acquire an image of the pre-printed label stock.

Inspection Executive

The Inspection Executive is responsible for carrying out inspections on the label image and producing an overall result for the inspection. The details/algorithms of the inspection are specified in the Inspection Configuration and as such carry out the actual inspections. The Inspection Executive ensures that they are carried out in a timely and controlled manner. The inspection executive is used by the Inspect Image state of the Busy state machine as described above.

The Inspection Executive is responsible for carrying out inspections on the label image and producing an overall result for the inspection. The details/algorithms of the inspection are specified in the Inspection Configuration and as such carry out the actual inspections. The Inspection Executive ensures that they are carried out in a timely and controlled manner. The Inspection Executive component makes use of the Vision Library Abstraction Layer in order to permit the use of alternative vision libraries.

Figure 24:
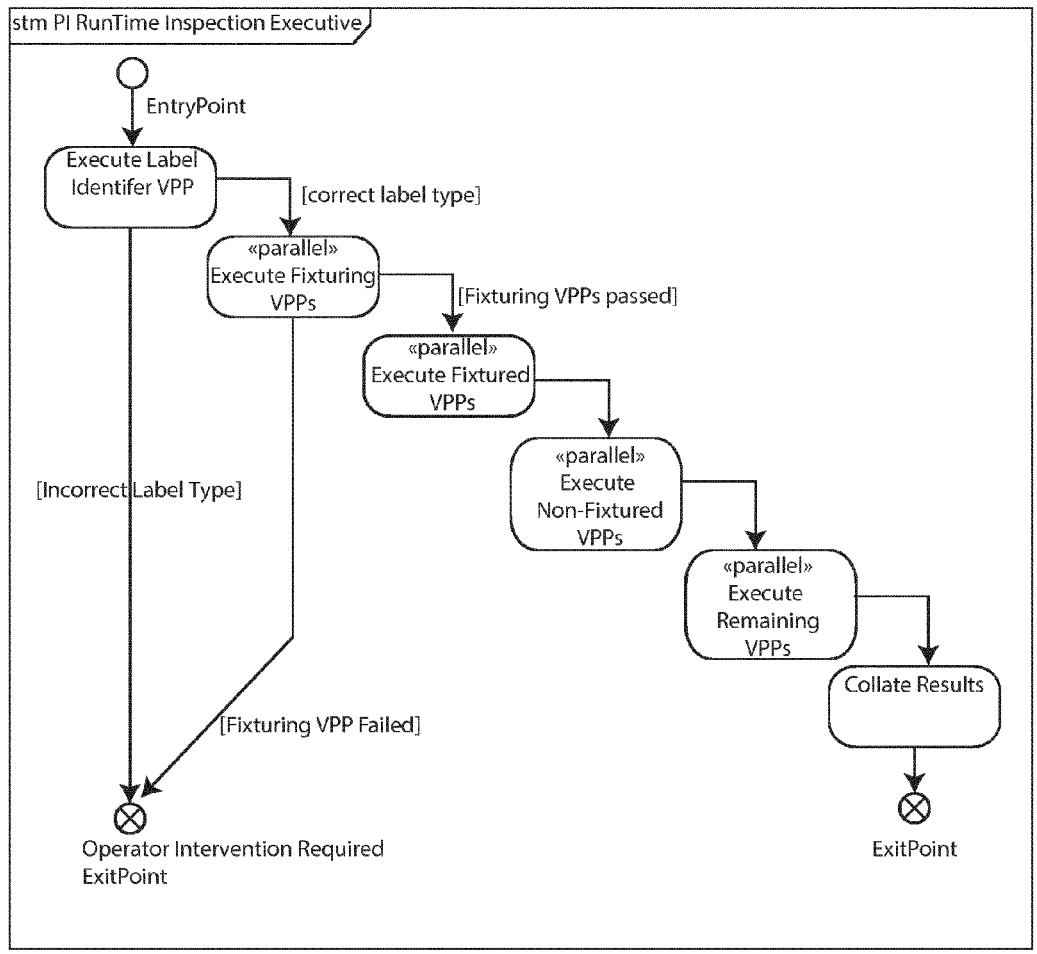
Figure 25:
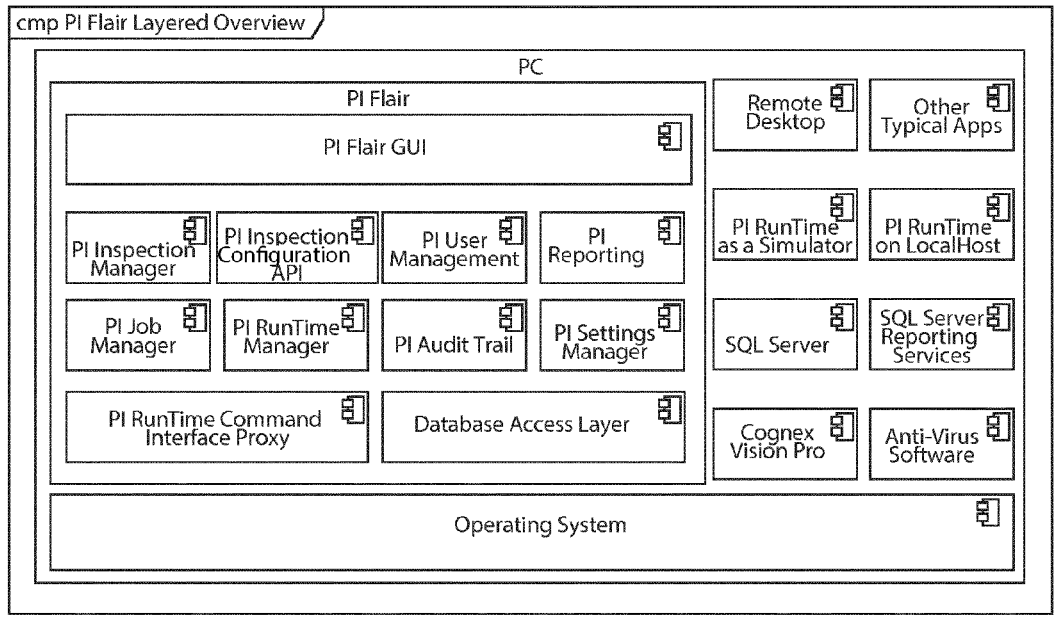
FIGS. 25 and 26 are layered overviews of the system in one embodiment.
Figure 26:
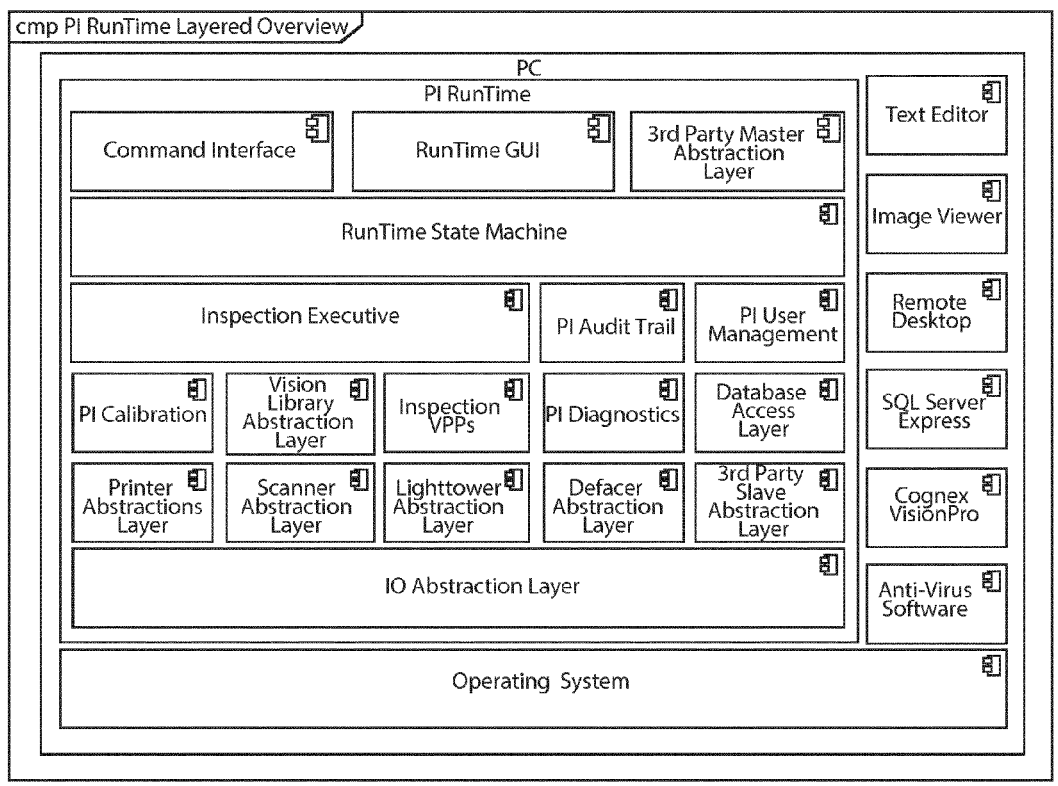

The Inspection Executive executes the inspection algorithms of the inspection configuration as shown in FIG. 24. The various inspection algorithm types are executed sequentially in the following order:

(a) Label Type Identifier inspection algorithm
(b) Fixturing inspection algorithms
(c) Fixtured Inspection algorithms
(d) Non-fixtured Inspection algorithms
(e) Any remaining inspection algorithms The collection of inspection algorithms of the same type/layer are executed in parallel. For example, the fixturing inspection algorithms are executed in parallel with each other, and the fixtured inspection algorithms are executed in parallel with each other. The Inspection Executive is designed to prevent/handle concurrency related concerns, e.g. shared resource usage, concurrent memory access, deadlock, race conditions, etc. It is possible to use an alternative Inspection Executive where it is required to run inspection algorithms according to a different hierarchy/sequence. It is possible to realize alternatives for each state of the inspection executive where it is required to run inspection algorithms in a sequential manner or other alternative manner The Scanner Abstraction Layer component is used to shield the RunTime State Machine component from the details of the scanning operation and the scanner hardware. The Printer Abstraction Layer component provides similar functionality with respect to the printer. Printer control is limited to interrupting the printer in order to prevent it printing the next label; no functionality is provided to tell the printer what label to Where this can be achieved using digital IO only, the IO Abstraction Layer component is used to assist the Printer Abstraction Layer component. The IO Abstraction Layer component is also used as the primary interface to all other digital IO, e.g. control of a defacer.

Handling Inspection Configurations

Regarding the injection of batch/variable data into inspection configurations, the inspection configuration and definition models are used. PI RunTime validates all inspection configurations, on receipt, for correct structure and presence of all required items before being processed. Cached inspection configurations are similarly validated prior to being used.

It is not be possible to complete PI RunTime compatible inspection configurations having batch/variable data solely within the client (i.e. PI Prime, PI Flair). Therefore, this functionality is provided by PI RunTime. The client pre-creates and parameterises the necessary inspection algorithm wrappers within the inspection configuration. Batch/variable data related inspection algorithm wrappers are clearly identified within the inspection configuration. PI RunTime assigns the batch/variable data, received as part of the start job use case, to the inspection algorithm wrappers and trains the inspection algorithms associated those wrappers prior to releasing the print job. Training of inspection algorithms amounts to supplying the batch/variable data to the inspection algorithm and instructing the vision libraries to train the inspection algorithm using that batch/variable data as its reference data. The exact details of training depend on the vision library tools used. Also, the batch/variable data can be images, text or barcodes.

Regarding serialization and randomization batch/variable data, a similar process to the above is used for training. The main difference is the necessity to train the inspection algorithm for each label. PI RunTime handles serialization and randomization batch/variable data in a common way. In both cases a serialization data set is defined that describes the list of variable data items in the order in which they are printed, and consequently inspected. Prior to enabling the printing of each individual label its associated variable data is obtained from the serialization data set and the relevant inspection algorithm trained on same. Regarding the sending of serialization data sets to PI RunTime, this is performed as part of start job use case. Provision is made in the design to handle cases where the serialization data sets are so large that the time taken to download them causes a significant delay in the starting of jobs. In such cases an initial portion of the complete data set is sent to PI RunTime as part of the Start Job use case. PI RunTime then requests the next portion of the dataset when it has consumed the previous portion.

Command Interface

The command interface provides a single common way of interfacing/interacting with PI RunTime. By routing all such functionality through the Command Interface component the same level of user interaction and control is made available to PI Flair and PI Prime. The RunTime GUI also avails of this component to facilitate realisation of its required functionality.

The command interface is responsible for accepting commands and verifying their basic structure/format. It is not responsible for executing those commands, instead it forwards those commands to the relevant component. Similarly the command interface is responsible for reporting internal events, e.g. inspection results, to the client and GUI on behalf of internal components.

The command interface encapsulates the protocol, i.e. the full set of interactions, used to communicate with the client such that internal PI RunTime components do not need to concern themselves with same. The command interface supports interacting with a client in non-obtrusive manner, e.g. reporting an inspection result to the client does not have a detrimental impact to the performance of the rest of the system. Since PI RunTime is commonly deployed on corporate LAN infrastructures, the command interface is designed to handle typically related concerns, e.g. firewall issues, addressing policies, etc.

PI Diagnostics

The PI Diagnostics component provides the user with a set of diagnostic tools and features to assist in the setting up and troubleshooting of the PI RunTime.

Vision Library Abstraction Layer

The Inspection Executive component makes use of the Vision Library Abstraction Layer in order to permit the use of alternative vision libraries.

The RunTime GUI component is responsible for displaying the results of the inspections to the user. It also provides the user with access to other functionality, e g manually override inspection failures, adjust settings, calibrate the system, run diagnostic tools, etc. All such functionality is routed through the Command Interface component in order to provide the same level of user interaction and control via PI Flair and PI Prime.

The PI User Management component is used to control who has the permission to do what within PI RunTime. The PI Audit Trail component is used to record all critical actions carried out by the user within PI RunTime. The PI Diagnostics component provides the user with a set of diagnostic tools and features to assist in the setting up and troubleshooting of the PI RunTime. The PI Calibration component provides the user with the means to calibrate the system.

Inspection Sensitivity Profiles

There are in the system default inspection sensitivity profiles, identified on the interface level by means of GUIDs and associated strings. GUIDs are used to enable changing the strings given to each profile and to support localisation of the strings. Provision is made for the easy addition/alteration of the list of supported profiles.

For each inspection type, the default inspection sensitivity profiles are fully defined, i.e. default values are defined for every parameter associated with that inspection type for each of the default sensitivity profiles. The default profiles are separated from each other by a defined amount. Provision is made in the design for the easy addition/alteration of the list of supported profiles. For each inspection type, the default inspection location profiles are fully defined, i.e. default values are defined for every parameter associated with that inspection type for each of the default location profiles. The default profiles are separated from each other by a defined amount.

OTHER EMBODIMENTS

In various embodiments, the image processing circuit may adjust the image to allow for stretch, skew, and offset-variations that are a part of label production and need to be accommodated as part of successful label inspection. It then automatically activates analysis tools to analyze the image and decide whether or not it meets the preset criteria. The system may have a range of tools that can be deployed to analyze different regions depending on the type(s) of inspection required.

In an image displayed by the system interface, green boxes may be displayed around the various elements to indicate that those elements have been inspected and have passed. A box may be colored red if the object fails inspection. Other diagnostics may be displayed to further identify the errors found A master image may have a resolution of between 300 dpi and 600 dpi. The user can choose between speed and accuracy. The higher the resolution is, the lower the speed.

The output speed of the label as it is being scanned can be up to 300 mm per second. The system may be adapted to cope with variable speeds from 50 mm to 300 mm per second. It is preferable that the resolution be set at somewhere between 300 dpi and 400 dpi at speeds in the range of 50 mm to 150 mm per second for optimum results. The resultant image is typically about 6 Mbytes to 10 Mbytes in size, which is a sizeable image to manipulate.

The system may match sections of a label with reference data using the following automatic software tools. The choice of tool is dependent on the data being inspected.

1D and 2D Barcode Tools

There is one and only one code such as a 1D/2D code per region, and of course there may be multiple regions. A decoded string can then be compared against a fixed value or a batch-defined value, or it can be configured so that the inspection of the region will pass as long as any value is read. The quality of the inspected barcode can also be compared to a user defined threshold value.

Text Recognition Tool

The Text Recognition tool performs optical character verification (OCV) and optical character recognition (OCR). OCV is a process for verifying that a character string within an image contains the expected characters at each position, while OCR determines what characters are in a character string without any definite preconception of what they are. This tool is typically used to verify/recognize lot codes, date codes, expiration dates and other information printed on labels. The tool can detect missing print, defective print and incorrect text. This tool can verify serialized data, i.e. a different code per label such as a serial number.

The tool is configured with a font file that defines the layout of each character in the font. A font file is created from images of the printed text on a label and, therefore, can be supplied as a generic file, or can be customized to suit an individual customer's label requirements. By showing the Font Training Tool a variety of examples of characters a font can be optimized to understand and allow for acceptable variations in a customer's label printing process.

The tool works by performing a pattern match between the characters in the trained font file and runtime characters (characters captured by the imaging of the label). Historically, because the appearance of characters can change in a variety of ways from one image to the next, a wide variety of tolerances were needed to cater for such transformations. With this tool the Font Training step eliminates the need for such a wide variety of tolerances, and therefore there are only a small number of tolerances for the user to set up In the case of character verification, the tool may be trained (at batch start) with the expected string for a particular batch. The runtime inspection returns a pass or fail depending on whether the expected string is verified or not. In the case of character recognition the tool returns the string that is read by the tool and compares it to the match string that was set at batch start. If the string cannot be read or does not match the expected match string then the inspection fails, otherwise it passes. Even minor printing errors are detected because the system has the ability to detect slight differences between one image and the next.

Absence Check Tool

The absence check tool combines features of the blob and histogram tools to give accurate inspection results. The tool is best applied to label regions where there should be no printed text. It is designed to detect areas of excess print—spots, smears etc. The tool works by analyzing the grey scale information in a user-defined region to check for the presence excess print. The absence check tool may be configured to detect and categorize excess print against user supplied criteria.

Local GTC Inspection Tool

The Local GTC Inspection tool performs a detailed inspection of a user specified region and can detect issues caused by the following printing problems:

Faded Print Detection

The Local GTC Inspection tool allows the user to check the label for underburn, where the print starts to fade. This is a common problem on thermal printers, caused by insufficient heat or insufficient pressure. Limits are easily adjusted up or down depending on the required fail levels. If left unchecked it will cause a problem outside of the manufacturing environment where barcodes become unreadable because the bars become too thin and text may fade. It works by comparing the grey scale values of the pixels against a preset threshold and failing the label when this value drops below a specific value, indicating that the Print is starting to fade.

Coarse Graphic Inspection

The Local GTC Inspection tool can be used to detect excess or missing print in a region of interest and can be configured to be as sensitive or tolerant as the user wishes.

Print Alignment Detection

A common problem in thermal printing is caused by tracking problems on the thermal printer, and/or a mis-aligned sensor. The overprinted text is not aligned properly with the pre-printed text and in severe cases some of the overprint can print on the label stock. This tool works by performing a positional check on blocks of text or images to be inspected. If their position has shifted relative to the ideal, by an amount that exceeds what is deemed acceptable by the user, this test will fail.

Fine Graphic Inspection

Local GTC Inspection tool combines features of blob and pattern match tools as well as dedicated image comparison methods to give accurate inspection results. The tool is ideally suited to critical information and graphics. It detects missing characters on critical text that may not be suitable for the text recognition tool The Local Golden Template Comparison (LocalGTC) tool performs the following five steps:

1. Creation of the Golden Template from a region of interest of a good sample image.
2. Alignment of each image being inspected (the Current Image) to the Golden Template Image.
3. Subtraction of the Current Image from the Golden Template Image.
4. Creation of an Absolute Difference Image.
5. Analysis of the Absolute Difference Image to extract important differences detected within the region of interest of the Current image.

The above steps are supplemented by a number of additional processing operations in order to reduce false errors and enhance LocalGTC performance when dealing with inconsequential variability in incoming images with respect to the grey scale, minor pattern changes and small variations in image scale and rotation.

The additional steps are:

1. Use of precise local fixturing which compensates for local variations in incoming image pattern scale, stretch and angle.
2. Automatic normalization of grey scale of images to compensate for small variability of grey scale.
3. Creation of additional internal images used to handle edge effects and mis-registration errors caused by various print characteristics.
4. Additional filtering operations to further reduce unimportant small differences.
5. Discrimination and measurement of the individual detected Missing and Excess differences (blobs) and the combined Whole differences.
6. Classification of the measurements to extract only the defective blobs, e.g. those which exceed predefined shape tolerance criteria.

LocalGTC uses all the above mentioned processes and additionally includes a number of other image processing operations to optimize performance for different print types including grey scale normalization, calculation of different images, and defect discrimination. LocalGTC Training section includes also an Automatic Region Training Module to reduce training effort needed in creating Inspection Programmes. Label inspection by LocalGTC is performed on a region-by-region basis rather than on a full-size label.

Accordingly, one of the initial operations is to specify Region-of-Interest (ROI) for inspection and also to extract image of that region from the overall image label. By extracting and dealing with smaller regions, significant savings in processing memory requirements are achieved. Image pre-processing operations are designed to enhance the image and to also automatically adjust image contrast so that it matches contrast of Golden Template image.

It will be appreciated that the invention provides an inspection system which achieves improved inspection quality. This is achieved because of per-region inspection irrespective of where the region is located. Advantageously, it builds co-ordinates per label, thereby avoiding the prior art problems of false testing due to the label being offset in position. Also, due to breakdown of the task to independent regions, the system can efficiently and effectively handle the inspection task even though it would otherwise be excessively complex. The following summarizes some of the major advantages:

Seamless integration of the inspection hardware with the printer
The integration can work with different print modes including cutter, peel off, rewind, etc.
Ability to scan labels of different forms and profiles (the scanner height is adjustable)
Ability to integrate with multiple printer types
Use of complex algorithms
The system can handle serialization
The use of complex vision tools e.g., fixturing, normalization, GTC.

The invention is not limited to the embodiments described but may be varied in construction and detail.

What is claimed is:
1. A label inspection system comprising:
a label scanner and a scanner controller, and
a processor configured to analyze scanned images with inspection tools and determine a quality control output,
the processor being configured to identify regions in a scanned label and to perform inspection associated with each region, and
at least some of said tools including a stored training image and associated test data defining said regions and inspection criteria for the regions,
the scanner being mounted in a housing of a fixture arranged to be incorporated into or onto a printer to receive a feed of labels driven by the printer without need for a drive dedicated to the inspection, and
the scanner controller being configured to cause image acquisition in real time in a manner which is synchronized with speed of the printer label movement, and
the processor being configured to generate and store an inspection configuration for each type of label, with an inspection definition per label region and a reference image; and wherein the inspection configuration contains inspection definitions in layers with containers holding inspection definitions to be applied at that layer, and wherein the reference label includes a format label, a product label, and a batch label, and wherein the format label defines the label structure including:
variable placeholders including an image placeholder, a text string placeholder, a code placeholder, a line, a box or a circle, and
location and dimensions for each placeholder,
wherein the product label is a specialization of the format label and includes a set of product level placeholders for data known at label design time, and wherein the batch label is a specialization of the product label in which batch level variable data is captured as a set of variable batch data which is not known until print time, and said batch label is configured to capture batch data including serialization descriptors as individual label identifiers, and wherein the inspection definitions define type of inspection and the location and dimension of the inspection definition specifies the region of the reference image to which the inspection definition applies.

2. The label inspection system as claimed in claim 1, wherein the housing includes a label web guide plate.

3. The label inspection system as claimed in claim 1, wherein the processor includes at least some components housed within said housing.

4. The label inspection system as claimed in claim 1, wherein:
the scanner is a line scanner and is configured to trigger line scans according to label speed to achieve a desired pixel shape,
the scanner controller is configured to monitor printer motor operation to determine in real time the label speed, and
the scanner controller is configured to non-intrusively monitor said label printing speed, and
the scanner controller is configured to probe printer motor drive signals.

5. The label inspection system as claimed in claim 1, wherein the scanner includes an adjustment mechanism to adjust size of a gap through which a label passes as it is being scanned, and wherein said adjustment mechanism is configured to determine optimum gap by focusing on a test label.

6. The label inspection system as claimed in claim 1, wherein the processor is configured to carry out fixturing, in which XY coordinates of a region to be inspected are located and used to determine both area and position of the region, and the processor compensates for positional variation of said region and of additional regions by deducing their locations.

7. The label inspection system as claimed in claim 1 wherein:
the processor is configured to carry out fixturing, in which XY coordinates of a region to be inspected are located and used to determine both area and position of the region, and the processor compensates for positional variation of said region and of additional regions by deducing their locations; and
the processor is configured to perform said compensation to the extent of compensating for label distortion arising from label stretching, skewing, sliding, and/or buckling, and the processor is configured to determine region location and size according to one or more anchor points.

8. The label inspection system as claimed in claim 1, wherein the processor is configured to generate and store an inspection configuration for each type of label, with an inspection definition per label region and a reference image.

9. The label inspection system as claimed in claim 1, wherein an inspection definition declares whether or not there is variable data associated with the inspection and the details of that variable data including the expected format of a string to be inspected and string content and a font descriptor, and a serialization descriptor holding the details of the serialisation and randomisation inspections.

10. The label inspection system as claimed in claim 1, wherein the processor is configured to perform the steps of:
   storing a template from a region of interest in a training image,
   aligning each image being inspected to the training image,
   subtracting the current image from the training image, creating an absolute difference image, and
   analyzing the absolute difference image to extract differences detected within the region of interest of the current image.

11. The label inspection system as claimed in claim 1, wherein the processor is configured to perform the steps of:
   storing a template from a region of interest in a training image,
   aligning each image being inspected to the training image,
   subtracting the current image from the training image, creating an absolute difference image, and
   analyzing the absolute difference image to extract differences detected within the region of interest of the current image, and
   wherein the processor is configured to:
   perform automatic normalization of grey scale to compensate for small variability of grey scale,
   use additional internal images to handle edge effects and mis-registration errors caused by print characteristics,
   perform filtering operations to further reduce unimportant small differences, and
   perform discrimination and measurement of the individual detected missing and excess difference blobs and the combined whole differences, to perform classification of the measurements to extract only the defective blobs.

12. The label inspection system as claimed in claim 1, wherein the processor is configured to develop inspection functions during label design, and to select inspection tools during label design time as an integral part of a label design process, said tools including an inspection context defining what is to be inspected at a level of abstraction, and wherein the system is configured to develop said tools by adapting a tool template with insertion of specific configuration settings such as geometric coordinates and inspection criteria.

13. The label inspection system as claimed in claim 1, wherein the inspection tools include a tool for barcode testing, said tool being configured to locate and decode one barcode line in a region of an input image, and to characterize the barcode in quality terms.

14. The label inspection system as claimed in claim 1, wherein the processor is configured to perform a positional check on blocks of text or images to be inspected, wherein said processor is configured to operate in a specified region to detect missing characters on text that may not be suitable for text recognition; and wherein the processor is configured to perform optical character recognition and to use said recognition to perform verification of character strings.

15. The label inspection system as claimed in claim 1, wherein:
   the processor is configured to perform a positional check on blocks of text or images to be inspected, wherein said processor is configured to operate in a specified region to detect missing characters on text that may not be suitable for text recognition;
   said processor is configured to perform optical character recognition and to use said recognition to perform verification of character strings; and
   said processor is configured with a font file that defines layout of each character in the font in the scanned image; and said processor is configured to perform a pattern match between characters in the specified font file and scanned characters.

16. The label inspection system as claimed in claim 1, wherein the processor is configured to execute a fine graphic inspection tool to combine features of blob and pattern match tools and image comparison methods to give accurate inspection results; and wherein the tool is applied to information and graphics.

17. The label inspection system as claimed in claim 1, wherein the processor is configured to:
   operate a run-time state machine to manage user requests and idle states, manage a busy state with states including some or all of printer unlock, image acquire, printer block, record result, present result, and inspect image, and
   execute runtime software which is modular to the extent of being deployable on a stand-alone basis or integrated with label design software, and
   wherein the system comprises a dedicated database for reference images and inspection data.

18. A method of developing software for a label inspection system, comprising:
   a label scanner and a scanner controller, and a processor configured to analyze scanned images with inspection tools and determine a quality control output, the processor being configured to identify regions in a scanned label and to perform inspection associated with each region, and wherein:
   at least some of said tools include a stored training image and associated test data defining said regions and inspection criteria for the regions,
   the scanner is mounted in a housing of a fixture arranged to be incorporated into or onto a printer to receive a feed of labels driven by the printer without need for a drive dedicated to the inspection,
   the scanner controller being configured to cause image acquisition in real time in a manner which is synchronized with speed of the printer label movement, and
   the processor being configured to generate and store an inspection configuration for each type of label, with an inspection definition per label region and a reference image; and wherein the inspection configuration contains inspection definitions in layers with containers holding inspection definitions to be applied at that layer, and wherein the reference label includes a format label, a product label, and a batch label, and wherein the format label defines the label structure including:
   variable placeholders including an image placeholder, a text string placeholder, a code placeholder, a line, a box or a circle, and
   location and dimensions for each placeholder,
   wherein the product label is a specialization of the format label and includes a set of product level placeholders for data known at label design time, and wherein the batch label is a specialization of the product label in which batch level variable data is captured as a set of variable batch data which is not known until print time, and said batch label is configured to capture batch data including serialization descriptors as individual label identifiers, and wherein the inspection definitions define type of inspection and the location and dimension of the inspection definition specifies the region of the reference image to which the inspection definition applies; and the scanner controller is configured to cause image acquisition in real time in a manner which is synchronized with speed of the printer label movement, the method comprising the steps of during label design, identifying label print regions and specifying inspection requirements on a per-region basis.

19. The method as claimed in claim 18, wherein the inspection requirements are provided as an inspection context which is a structured, layered, hierarchical, description of required inspection configurations, and the method comprises:

developing a context during design time, the label inspection system automatically generating inspection configurations in run time, and wherein there are at least two forms of inspection context, including a product label context describing required inspection definitions at a product label, and a batch level context for variable data which is not be specified until print time, the label inspection system during run time, caching inspection configurations such that for recurrent print jobs of the same product label only batch related information need be processed, and wherein the context is constructed in a manner that maps to a compliant inspection configuration and contains at least all the data required to generate the inspection configuration, and wherein the context includes a reference image upon which the inspection definitions are to be built and an inspection profile definitions containing parameter values for a given inspection type.

* * * * *